United States Patent
Heynen et al.

(10) Patent No.: US 10,803,640 B2
(45) Date of Patent: Oct. 13, 2020

(54) METHOD AND APPARATUS FOR DESIGNING LAYOUT FOR USER INTERFACES

(71) Applicant: Apple Inc., Cupertino, CA (US)

(72) Inventors: Patrick O. Heynen, Redwood City, CA (US); Marian E. Goldeen, Three Rivers, CA (US); Jordan P. McCommons, San Francisco, CA (US); William J. Feth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 208 days.

(21) Appl. No.: 15/283,435

(22) Filed: Oct. 2, 2016

(65) Prior Publication Data

US 2017/0124746 A1 May 4, 2017

Related U.S. Application Data

(63) Continuation of application No. 12/896,828, filed on Oct. 1, 2010, now Pat. No. 9,513,883.

(51) Int. Cl.
*G06T 11/60* (2006.01)
*G09G 5/377* (2006.01)
*G06F 8/38* (2018.01)

(52) U.S. Cl.
CPC .............. *G06T 11/60* (2013.01); *G06F 8/38* (2013.01); *G09G 5/377* (2013.01); *G06T 2200/24* (2013.01); *G09G 2340/12* (2013.01)

(58) Field of Classification Search
CPC ..... G06T 11/60; G09G 5/377; G09G 2340/12
See application file for complete search history.

(56) References Cited

U.S. PATENT DOCUMENTS

| 5,379,234 | A * | 1/1995 | Wilson | G06T 11/206 703/11 |
|---|---|---|---|---|
| 7,734,583 | B2 | 6/2010 | Vitanov et al. | |
| 2004/0100500 | A1* | 5/2004 | Chung | G06F 3/04892 715/767 |
| 2005/0143126 | A1 | 6/2005 | Chipchase | |
| 2005/0187943 | A1 | 8/2005 | Finke-Anlauff et al. | |
| 2005/0216836 | A1* | 9/2005 | Duke | G06F 17/248 715/245 |
| 2006/0004699 | A1 | 1/2006 | Lehikoinen et al. | |
| 2006/0136556 | A1 | 6/2006 | Stevens et al. | |

(Continued)

*Primary Examiner* — Nhat Huy T Nguyen
(74) *Attorney, Agent, or Firm* — Invoke

(57) ABSTRACT

A method is provided that receives an image that includes graphical metadata for specifying alignment information. The method renders the image by using the alignment information. Rendering the image by using the alignment information includes positioning text on the image, aligning the image with another image, and identifying visual boundaries of the rendered image. The graphical metadata includes a geometric shape that specifies a region on the image where the text is to be rendered. The alignment metadata also specifies a maximum size for text rendered on the image. In some embodiments, the image is a multi-layer image that includes a first layer for the image and a second layer for the graphical metadata. In some embodiments, the layer that includes the graphical metadata is designated to include graphical metadata. The graphical metadata is not rendered on a graphical user interface where the image is rendered.

23 Claims, 26 Drawing Sheets

(56) References Cited

U.S. PATENT DOCUMENTS

| | | | |
|---|---|---|---|
| 2006/0259872 A1* | 11/2006 | Mullen | G06T 11/206 715/764 |
| 2008/0168365 A1 | 7/2008 | Chaudhri | |
| 2008/0273813 A1* | 11/2008 | Takashima | G06T 11/60 382/284 |
| 2010/0013835 A1* | 1/2010 | Kuhns | G06T 11/00 345/471 |
| 2010/0142851 A1* | 6/2010 | Conlon | G06T 11/60 382/282 |
| 2010/0158471 A1 | 6/2010 | Ogikubo | |
| 2011/0202834 A1 | 8/2011 | Mandryk et al. | |
| 2011/0249026 A1* | 10/2011 | Singh | G09G 3/003 345/630 |
| 2012/0079390 A1* | 3/2012 | Ballagh | G06T 11/60 715/738 |
| 2012/0084685 A1 | 4/2012 | Feth et al. | |

* cited by examiner

Commands to draw different renditions of elementary assets with their associated graphical metadata
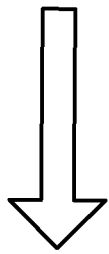
105
Graphics Editing Tool
Different renditions of the elementary assets and their associated graphical metadata
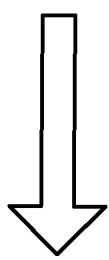
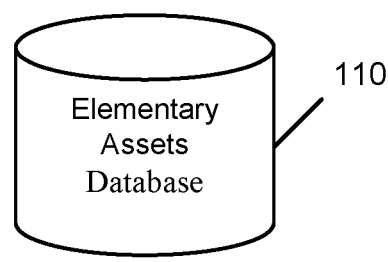
110
Elementary Assets Database
*Figure 14*

METHOD AND APPARATUS FOR DESIGNING LAYOUT FOR USER INTERFACES

CLAIM OF BENEFIT TO PRIOR APPLICATIONS

This Application is a continuation application of U.S. patent application Ser. No. 12/896,828, filed on Oct. 1, 2010, now published as U.S. Patent Publication 2012/0084685. U.S. patent application Ser. No. 12/896,828, now published as U.S. Patent Publication 2012/0084685 is incorporated herein by reference.

BACKGROUND

A graphical user interface (GUI) is a human-computer interface that allows a user to interact with programs through a set of graphical objects such as controls, icons, menus, and windows. The GUIs have all but replaced the earlier command line interfaces which used only text and were accessed solely by a keyboard. Users interact with GUI objects by using a mouse, trackball, touchpad, or keyboard. For instance, a mouse can be used to move a pointer on the screen on top of a GUI object such as an icon to select the object. Then the object can be moved by dragging or can be selected by clicking on its icon.

Many tools exist that facilitate writing GUIs for application developers. These tools provide libraries that define each GUI element, e.g., as a class, and provide application programming interfaces (APIs) from which an application can create object instances. Also source code for predefined methods are available that allow application developers to use or modify in order to develop application programs to display and manipulate GUI objects.

In order to control the specifics of the sizing and spacing of graphical elements, to determine where text is to be rendered relevant to the image, and to align graphical elements against each other, there is a need to generate a correspondence between the image artwork and the displayed layout. Typically a correspondence is made between the image artwork and what the code is doing by actually hard coding the desired layout in the software itself. There is therefore an explicit awareness of the underlying design and topology of the image artwork in the code. Such a correspondence would require custom written software programs to display GUI objects for the specific topology and alignment requirements of each application.

Tools are also available that allow manual entering of metadata that describe how graphical components of GUI elements can be aligned against each other and how the associated text can be placed on GUI elements at render time. These tools are used to enter the descriptions through a set of alphanumeric fields once the image artwork is designed. In order to specify the alignment information, measuring tools provided by graphics editing tools are used to determine the exact distances of text relative to the image as well as the distances of different graphical components relative to each other.

BRIEF SUMMARY

Some embodiments provide a method and a system for augmenting pixel based artwork for a graphical user interface (GUI) element with additional image-based metadata. In some embodiments, the additional metadata is used at runtime by an application that displays the user interface to enable correct alignment of text on a GUI element. For instance, an image for a pushbutton may include (in addition to the pushbutton bezel) graphical metadata in the form of a rectangle that identifies place (and the maximum size) of text being displayed on the pushbutton at runtime. Several different applications running at different times can use the same pushbutton image and the same graphical metadata to display different text on the pushbutton image.

In some embodiments, the GUI element includes several components and the graphical metadata enables the correct placement and rendering of multiple constituent parts of the overall GUI element. For instance, a slider includes a knob and a track. The knob and the track can each include graphical metadata in the form of geometric shapes that specify how the knob is to be aligned on the track when the knob is moved in runtime from one position to another position. In some embodiments, the GUI element includes graphical metadata to identify the boundaries (e.g., visual edges or corners) of the image as distinguished, e.g., from a drop shadow that is displayed with the image.

One advantage of including graphical metadata in the graphical assets is the ability to execute a wide variety of designs for interface elements purely through the graphical asset manipulation and without requiring any changes in the underlying software. Operations such as aligning text with an image at runtime and aligning different movable components of a graphical user interface element can be done by using pixel-based data that is delivered as an integral part of the image of the graphical asset itself.

In some embodiments, the image for the graphical asset is created as a multi-layer image. In these embodiments, one or more of the layers are utilized to include the graphical metadata. In some embodiments, one or more specific types of layers (e.g., channel layer, mask layer, and/or any other particular type of layer) in the image are designated to include graphical metadata to distinguish the layers that include metadata from layers that include the graphics for the rendered image.

BRIEF DESCRIPTION OF THE DRAWINGS

The novel features of the invention are set forth in the appended claims. However, for purpose of explanation, several embodiments of the invention are set forth in the following figures.

FIG. 14 conceptually illustrates the graphics editing tool of some embodiments.

DETAILED DESCRIPTION

Figure 1:
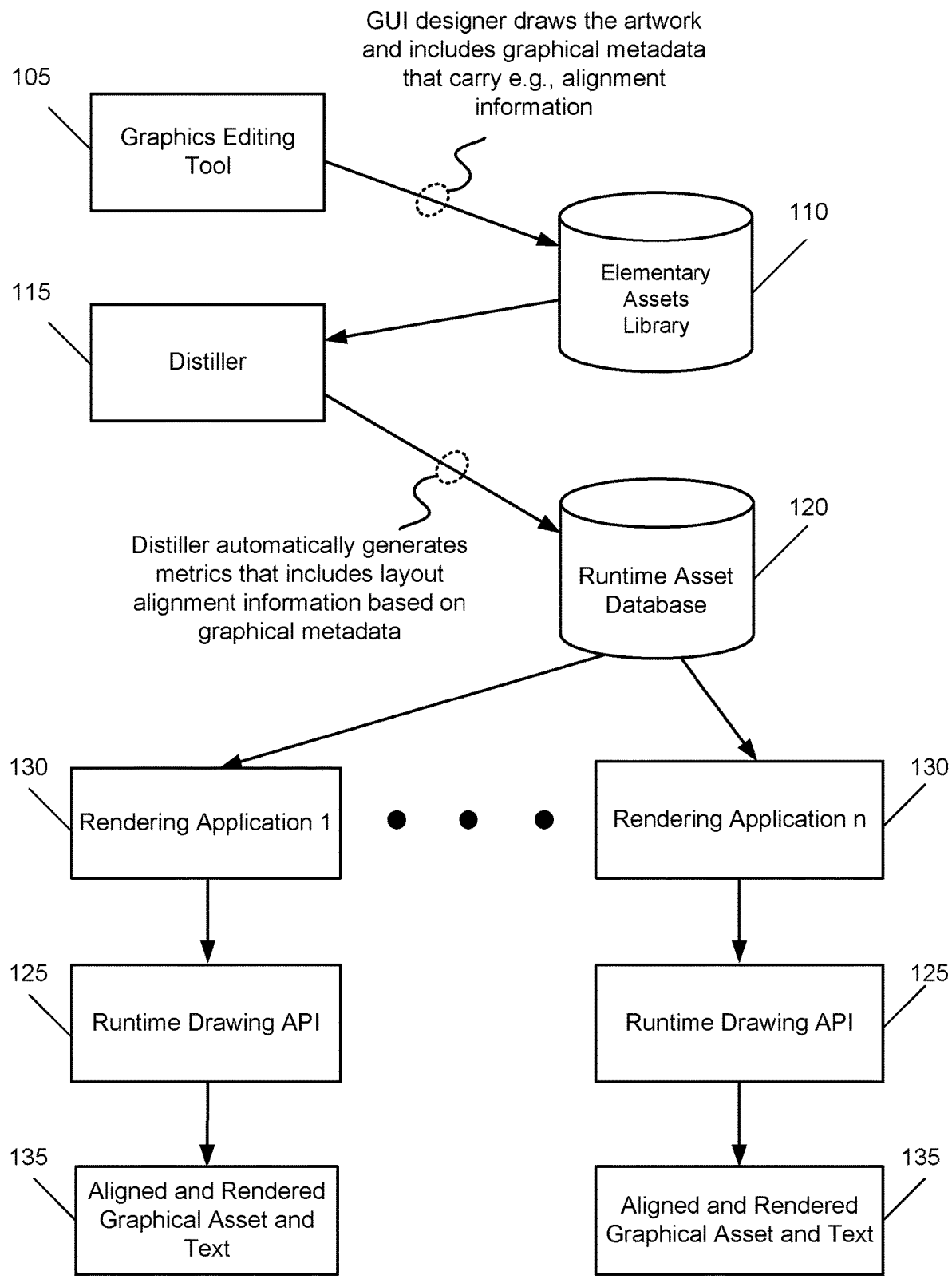
FIG. 1 conceptually illustrates the overall system for creating and drawing GUI assets in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method and a system for augmenting pixel based artwork for a graphical user interface (GUI) element with additional image-based metadata. In some embodiments, the additional metadata is used at runtime by an application that displays the user interface to enable correct alignment of text on a GUI element. For instance, an image for a pushbutton may include (in addition to the pushbutton bezel) graphical metadata in the form of a rectangle that identifies place (and the maximum size) of text being displayed on the pushbutton at runtime. Several different applications running at different times can use the same pushbutton image and the same graphical metadata to display different text on the pushbutton image.

In some embodiments, the GUI element includes several components and the graphical metadata enables the correct placement and rendering of multiple constituent parts of the overall GUI element. For instance, a slider includes a knob and a track. The knob and the track can each include graphical metadata in the form of geometric shapes that specify how the knob is to be aligned on the track when the knob is moved in runtime from one position to another position. In some embodiments, the GUI element includes graphical metadata to identify the boundaries (e.g., visual edges or corners) of the image as distinguished, e.g., from a drop shadow that is displayed with the image.

One benefit of including graphical metadata in the graphical assets is the ability to execute a wide variety of designs for interface elements purely through the graphical asset manipulation and without requiring any changes in the underlying software. Operations such as aligning text with an image at runtime and aligning different movable components of a graphical user interface element can be done by using pixel-based data that is delivered as an integral part of the image of the graphical asset itself.

In some embodiments, the image for the graphical asset is created as a multi-layer image. In these embodiments, one or more of the layers are utilized to include the graphical metadata. In some embodiments, one or more specific types of layers (e.g., channel layer, mask layer, and/or any other particular type of layer) in the image are designated to include graphical metadata to distinguish the layers that include metadata from layers that include the graphics for the rendered image.

Some embodiments provide a method that receives an image which includes graphical metadata for specifying alignment information. The method renders the image by using the alignment information. The alignment information is used to position text on the image. The alignment information is also used to align the image with another image. For instance, two components of a control element that move against each other are aligned by using graphical metadata that specify regions for aligning the image of the components. Graphical metadata also includes regions that identify the visual boundaries of the rendered images.

The graphical metadata includes a geometric shape that specifies a region on the image where the text is to be rendered. The alignment metadata also specifies a maximum size for text rendered on the image.

Some embodiments provide a computer readable medium that stores a computer program. The computer program is executable by at least one processing unit. The computer program includes a set of instructions for receiving an image that includes graphical metadata which specify alignment information. The computer program also includes a set of instructions for rendering the image by using the alignment information.

Some embodiments provide a method for defining a program for rendering an image for a user interface. The method defines a module for receiving an image that includes graphical metadata that specify alignment information. The method defines a module for rendering the image based on the alignment information.

Several more detailed embodiments of the invention are described in sections below. Specifically, Section I describes several term and definitions used in some embodiments. Next, Section II provides an overview of the graphical user interface drawing framework of some embodiments. Section III describes how graphical assets are aligned using graphical metadata. Section IV describes the software architecture of the graphical user interface drawing framework of some embodiments. Next, Section V describes the software architecture of the runtime drawing API of some embodiments. Lastly, Section VI provides a description of a computer system with which some embodiments of the invention are implemented.

I. TERMS AND DEFINITIONS

A. Graphical User Interface

In the following discussions, the term graphical user interface (GUI) is referred to a type of user interface (UI) that allows users to interact with computer programs. In addition to text, a GUI generally includes visual indicators and allows a human user to manipulate and interact with the GUI elements.

B. Graphical Assets

The image used to render a visual component of the GUI (such as a control or an icon) is referred to as an asset, artwork asset, or graphical asset interchangeably. For instance, an image for a checkbox, a pushbutton, and a slider are all referred to as an asset, artwork asset, or graphical asset.

C. Elementary Assets

There is a fundamental difference between the checkbox asset and the slider asset, however. The slider includes at least two parts, a track and a knob, while the checkbox is just a single checkbox. An elementary asset of the GUI is a unit of the GUI that cannot be broken down further into parts. For instance, the slider has at least two elementary assets, the knob and the track while the checkbox is the only elementary asset of the checkbox element. Although several examples are used that refer to elementary assets for simplicity, the teachings disclosed for different embodiments of the invention equally apply to assets that are not elementary (i.e., can still be broken into smaller packets).

D. Renditions

An elementary asset such as a checkbox can be drawn checked, unchecked, or partly checked. The checkbox can have different appearances when pressed, unpressed, disabled, or inactive. There can also be raised, inset, and matte variants as well as several different tints and several different sizes for the checkbox. The term rendition is therefore used to refer to a specific drawing of an elementary asset.

E. Graphical Metadata

Graphical metadata is referred to graphical drawings that are added to images of assets to convey additional information about the assets. For instance, a graphical metadata can be a geometric shape such as a rectangle or a polygon included in the image to specify the size and location of text to be displayed on the image at the render time (i.e., at the runtime of an application that displays the GUI to a user). As disclosed throughout the specification, graphical metadata are used to convey other information such as visual boundaries (edges and corners) of the rendered assets and regions for alignment of assets with each other. Graphical metadata are distinguished from alphanumeric metadata which define properties of the image by using strings of characters and numbers as opposed to shapes and graphical images that identify different regions for alignment and rendering of text and images.

II. OVERVIEW

FIG. 1 conceptually illustrates the overall system used for creating and drawing GUI assets in some embodiments. As shown, the system includes a graphics editing tool 105, a distiller 115, an elementary assets library 110, and a runtime asset database 120. The figure also shows several rendering applications using an application programming interface (API) to display graphical user interface assets such as controls and other graphical objects in some embodiments. The API includes one or more modules 125 which are used at runtime by the applications for drawing the assets.

As shown in FIG. 1, a designer (e.g., a graphics artist or a visual designer) uses the graphics editing tool 105 to create the graphical image (or artwork) for the assets. In some embodiment, each asset is stored in the form of a file or an object that includes the pixels needed to draw (or render) the asset.

The designer also draws graphical metadata (e.g., rectangles, polygons, ellipses, circles, etc.) that carry alignment and other information needed to display the artwork on a graphical user interface at runtime. The artwork for the asset therefore includes the graphical metadata for the asset. The use of graphical metadata to draw and align the assets is described further below. The asset artwork and the associated metadata are stored in the elementary assets library 110. The distiller 115 automatically analyzes the metadata and converts the graphical metadata into a set of metrics such as numerical coordinates for placing text on graphical objects or for aligning graphical objects with each other. The elementary assets and the associated metadata are stored in a runtime asset database.

At render time, one or more applications 130 utilize the API modules 125 to draw the graphical objects. In some embodiments, the applications 130 are linked to the API modules prior to the applications runtime. In other embodiments, the API modules are dynamically linked to the applications at the applications runtime. The drawing API modules 125 draw the graphical objects and associated text 135 requested by the applications using the artwork in the runtime asset database 120.

The graphics editing tool 105 is used when the GUI is being designed while the APIs are used during runtime of applications that display (i.e., draw or render) the GUI during their execution. The example of the distiller in FIG. 1 generates the runtime asset library 120 prior to the execution of applications 130. However, it would be realized by one of ordinary skill in the art that the distiller can be part of a real-time interpreter that converts graphical metadata into numerical coordinates for individual applications at runtime without deviating from the teaching for the embodiments of the invention. Specifically, in the embodiments that distiller 115 converts graphical metadata at runtime of applications 130, the distiller tool sends its output to the rendering applications and/or the APIs instead of (or in addition to) storing the output in the runtime asset database 120. Several different embodiments provided for creating and drawing GUI assets are described further below by reference to FIGS. 9-12.

Figure 2:
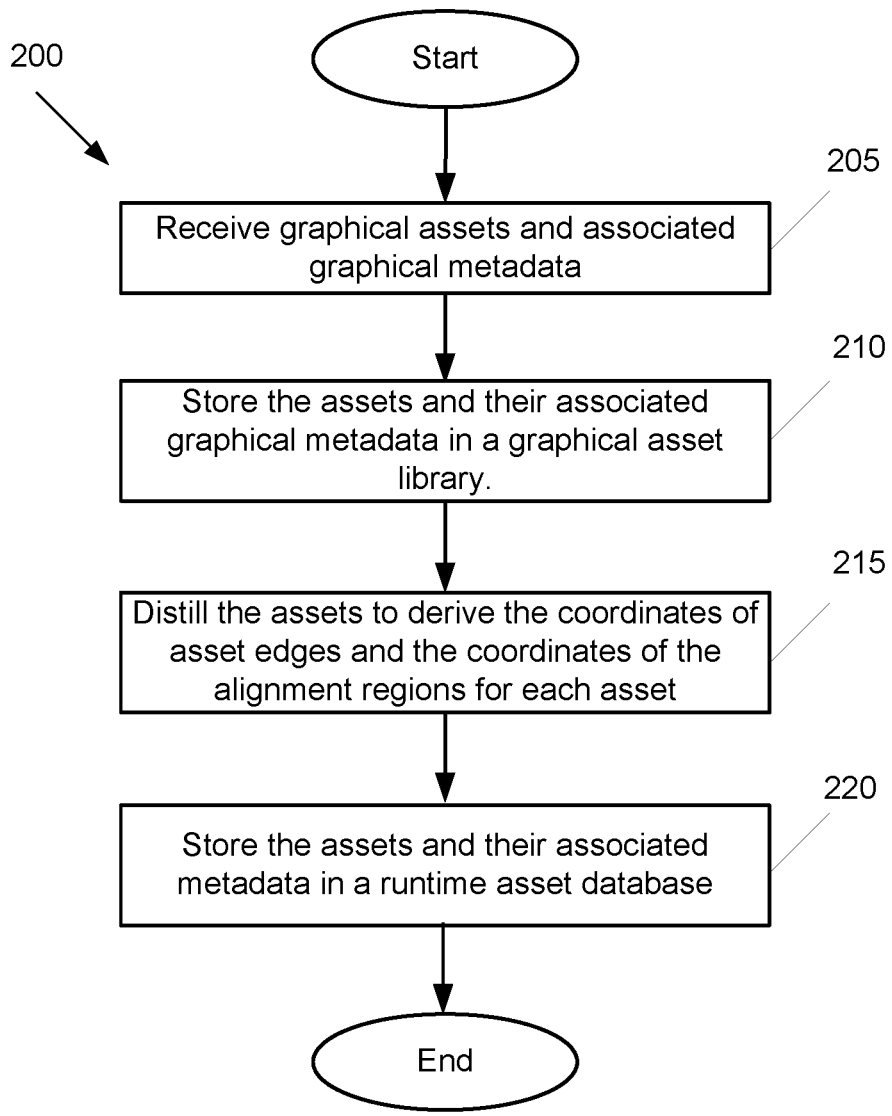
FIG. 2 conceptually illustrates a process for generating the image artwork assets such as controls and other graphical objects for graphical user interfaces in some embodiments.

FIG. 2 conceptually illustrates a process 200 for generating the artwork assets (such as controls and other graphical objects) for runtime processing in some embodiments. As shown, the process receives (at 205) the assets and the associated metadata. In some embodiment, the assets and metadata are received as they are designed in the graphics editing tool 105 of FIG. 1. In some embodiments, the assets and the metadata are imported, e.g., from an artwork library.

The process optionally stores (at 210) the assets and their associated graphical metadata in a graphical assets library 110. The process then distills (at 215) the assets to prepare the assets for runtime display by the drawing API modules 125. For instance, the process analyzes the graphical metadata associated with each asset and identifies the coordinates for the boundaries (visual edges or corners) of the assets. The process also analyzes the graphical metadata and identifies coordinates for the corners or edges of alignment regions used to align assets with each other and with their associated text. The process then optionally stores (at 220)

the assets and their associated metadata in a runtime asset database 120. The process then exits.

One of ordinary skill in the art will recognize that process 200 is a conceptual representation of the operations used to generate the artwork assets for runtime processing. The specific operations of process 200 may not be performed in the exact order shown and described. The specific operations may not be performed in one continuous series of operations, and different specific operations may be performed in different embodiments. Furthermore, the process could be implemented using several sub-processes, or as part of a larger macro process. For instance, some embodiments provide separate tools for graphics editing and distilling operations while other embodiments provide a single integrated tool.

Figure 3:
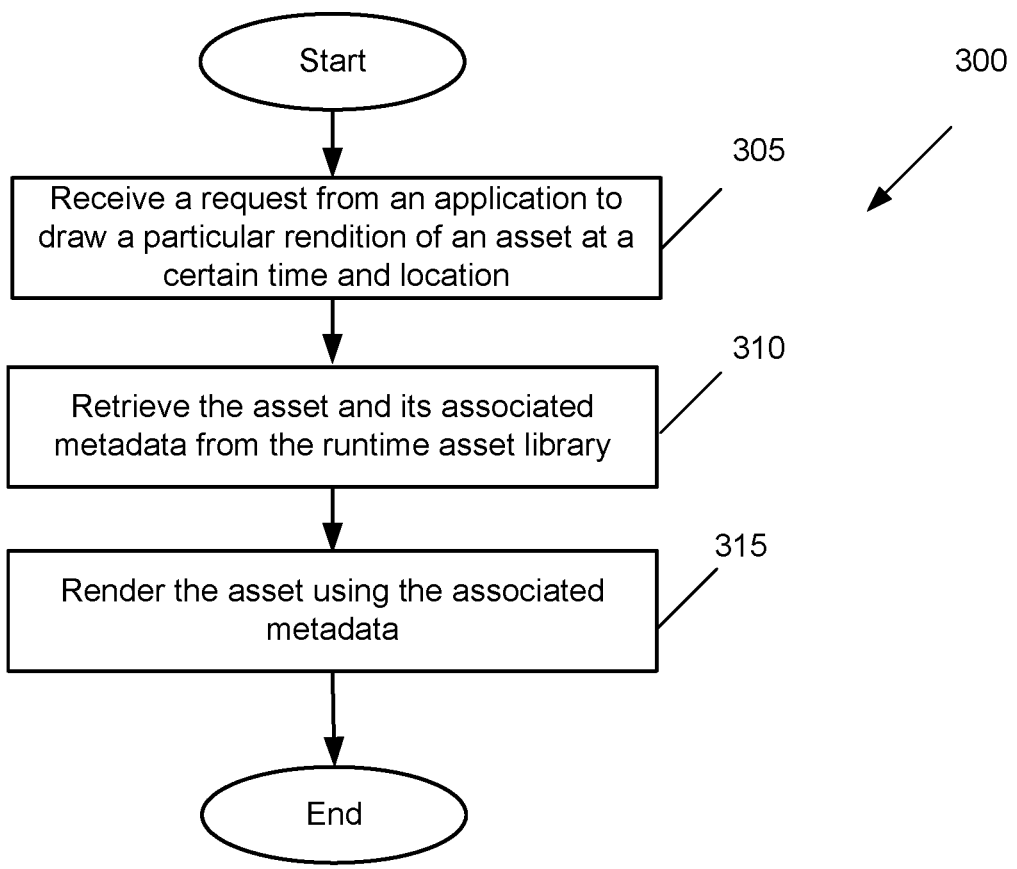
FIG. 3 conceptually illustrates a process for rendering graphical user interface objects in some embodiments.

FIG. 3 conceptually illustrates a process 300 for rendering (i.e., drawing or displaying) graphical user interface objects in some embodiments. In some embodiments, this process is performed by an application that renders the GUI for a user. As shown, the process receives (at 305) a request from an application to draw an asset. In some embodiments, the requesting application is linked (either at runtime or prior to runtime) to one or more modules 125 from the drawing API. In some embodiments, the requesting application identifies a specific rendition of each asset as well as the time and location where the asset has to be displayed (e.g., display the asset now at the cursor position or at certain coordinates).

The process then retrieves (at 310) the requested asset and its associated metadata from the runtime asset database 120. Next, the process uses the metadata to display the asset. For instance, the process uses the metadata to display the asset at a desired location (e.g., by using boundary identification metadata), to display text at proper location (e.g., by using text alignment metadata), and/or to align the asset with other displayed assets (e.g., by using asset alignment metadata). The process then exits. Some embodiments distill the assets as part of the same runtime process that renders the graphical assets on a graphical user interface. In these embodiments, operation 215 shown in FIG. 2 is performed as a part of process 300 instead of process 200. In these embodiments, operation 220 which stores the assets and their associated metadata in the runtime library is optional.

One of ordinary skill in the art will recognize that process 300 is a conceptual representation of the operations used to generate the artwork assets for runtime processing. The specific operations of process 300 may not be performed in the exact order shown and described. The specific operations may not be performed in one continuous series of operations, and different specific operations may be performed in different embodiments. Furthermore, the process could be implemented using several sub-processes, or as part of a larger macro process. Furthermore, operations 215 and 220 described in FIG. 2 are performed by process 300 in some embodiments.

III. USING GRAPHICAL METADATA FOR ALIGNING GRAPHICAL ASSETS

A. Multi-Layered Assets

Figure 4:
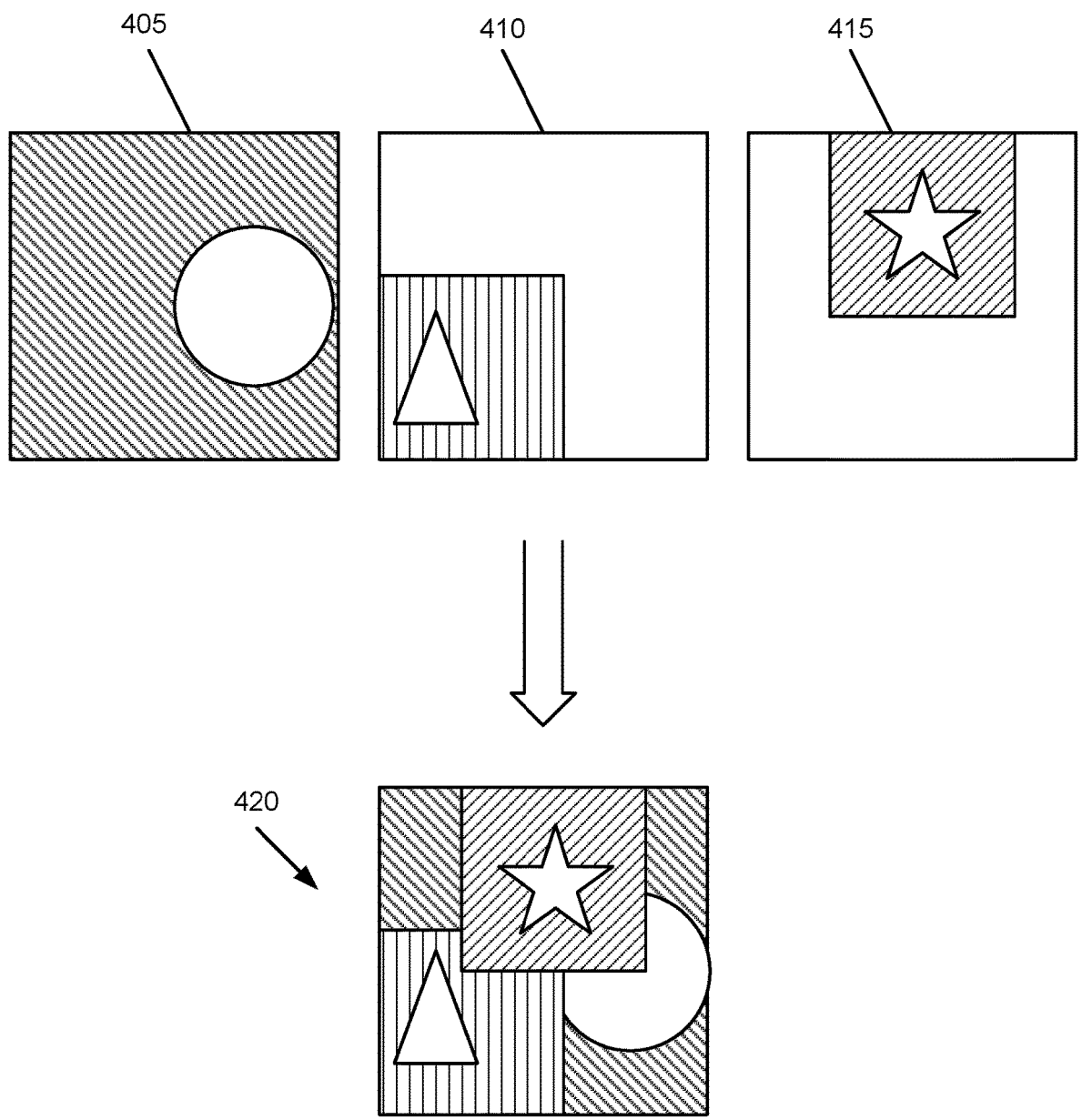
FIG. 4 conceptually illustrates a multi-layer artwork used to draw different graphical objects in some embodiments.

Some embodiments draw graphical image assets as multi-layered objects. The number of layers depends on the complexity of the asset. For instance, a glass push button requires a highlight layer. In addition, an asset may have different layers for different states such as normal, pressed, inactive, disabled, etc. FIG. 4 conceptually illustrates a multi-layered graphical object that includes three layers 405-415. The designer uses the graphics editing tool 105 to draw different layers of the asset. At render time, the layers are used to display the object. The drawing API 125 displays the asset 420 based on the properties of each layer (e.g., opacity, transparency, etc.).

Some embodiments utilize additional layers for adding other graphical objects such as drop shadows or highlights to the image. In addition, some embodiments designate one or more layers of an asset image to include graphical metadata for the asset. The graphical metadata is in the form of a geometric shape such as a rectangle, a polygon, an ellipse, a circle, or any arbitrary shape and specifies how the asset is aligned with text and other graphical assets. In addition, graphical metadata is used in some embodiments to identify the boundaries (i.e., visual edges and corners) of an asset.

In some embodiments, each layer includes multiple images for an elementary asset. For instance, a checkbox in each layer can include different images to indicate on (e.g., checked), off (e.g., unchecked), and mixed (e.g., shown as a dashed line) values for the checkbox. In addition, each value of the checkbox can have several different tints (e.g., blue, yellow, grey, green, etc.) in some embodiments. As an example, when there are three values, eight tints, and five states for a checkbox, there could be 120 renditions for the checkbox. These renditions can be arranged in five layers with each layer having twenty four renditions of the checkbox.

Figure 5:
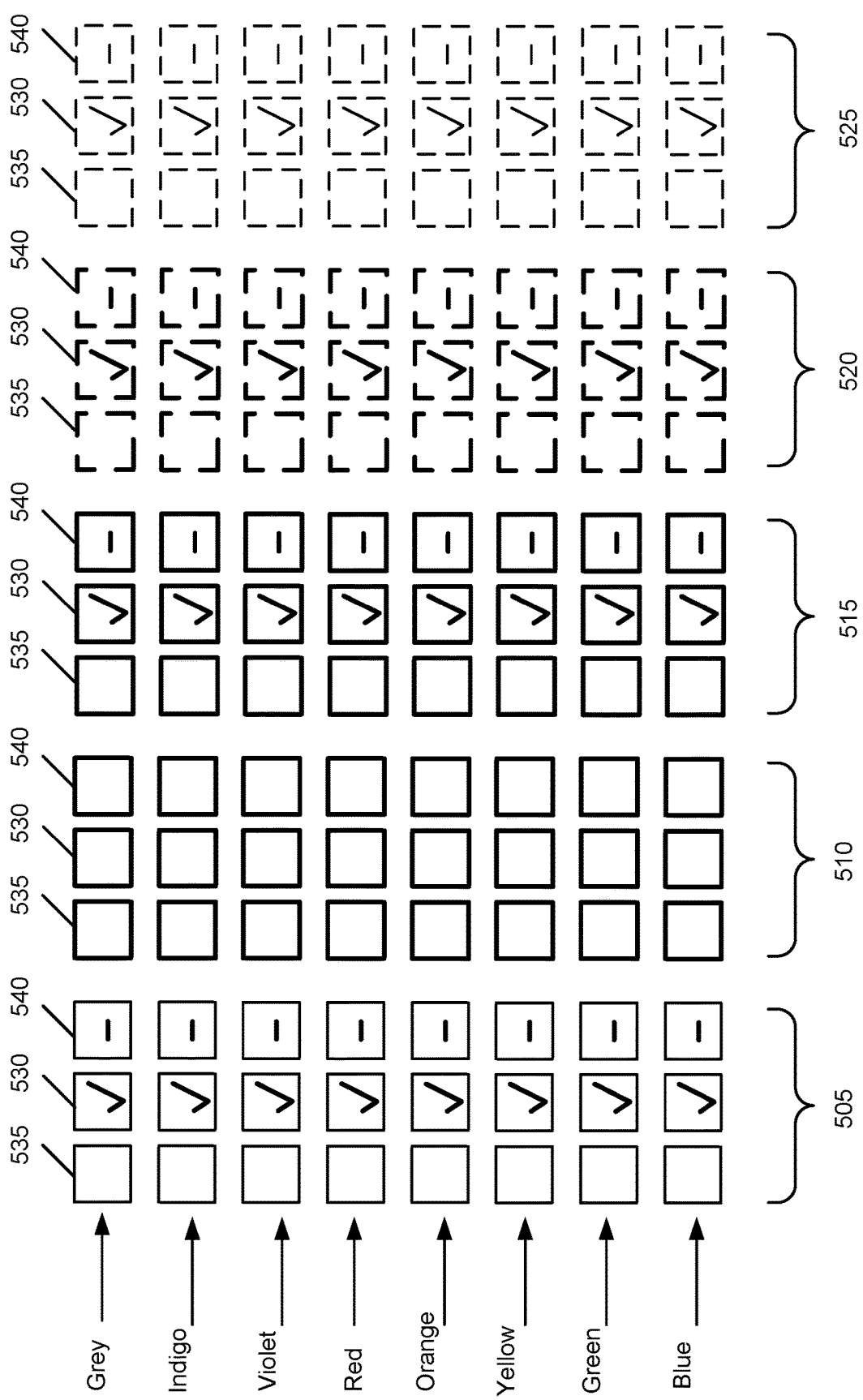
FIG. 5 illustrates images created for a checkbox elementary asset in some embodiments.

FIG. 5 illustrates images created for a checkbox elementary asset in some embodiments. As shown, the checkbox elementary asset has five states of normal 505, rollover 510 (used when a mouse goes over the object), pressed 515, inactive 520, and disabled 525. In some embodiments, each state is created in a separate layer. In some embodiments, different states of an asset are displayed with different shades and/or line thicknesses to visually identify the particular state.

The checkbox elementary asset also has three values of on 530, off 535, and mixed 540. In addition, the checkbox images in the example of FIG. 5 can have one of the eight tints of grey, indigo, violet, red, orange, yellow, green, and blue. The checkbox elementary asset of the example of FIG. 5 therefore has five layers and can have up to 120 different renditions (although in the example of FIG. 5 the rollover state has similar renditions for all three images related to each tint).

In some embodiments, the layer or layers used to include graphical metadata are distinguished from other layers. For instance, layers for graphical metadata are designated as channel layers, mask layers, or graphical metadata layers in some embodiments. Designating separate layers for graphical metadata makes it easier to identify and extract the graphical metadata from the image asset. The graphical metadata can be conceptually visualized as an acetate layer or mask on the asset layout. The graphical metadata therefore provides pixel data which is used to display and align graphical assets on a graphical user interface.

Storing image data and graphical metadata as a multi-layer object provides several advantages. For instance, image data is packaged coherently together with (and directly alongside) its associated graphical metadata in one object that can be stored in one data structure or in one file. At the same time, storing graphical metadata and image data in separate and easily identifiable layers, enables a tool such as the distiller tool 115 to easily identify and process the graphical metadata. Several examples of these graphical metadata are described in the following sub-sections.

B. Aligning Graphical Assets with Text

Figure 6:
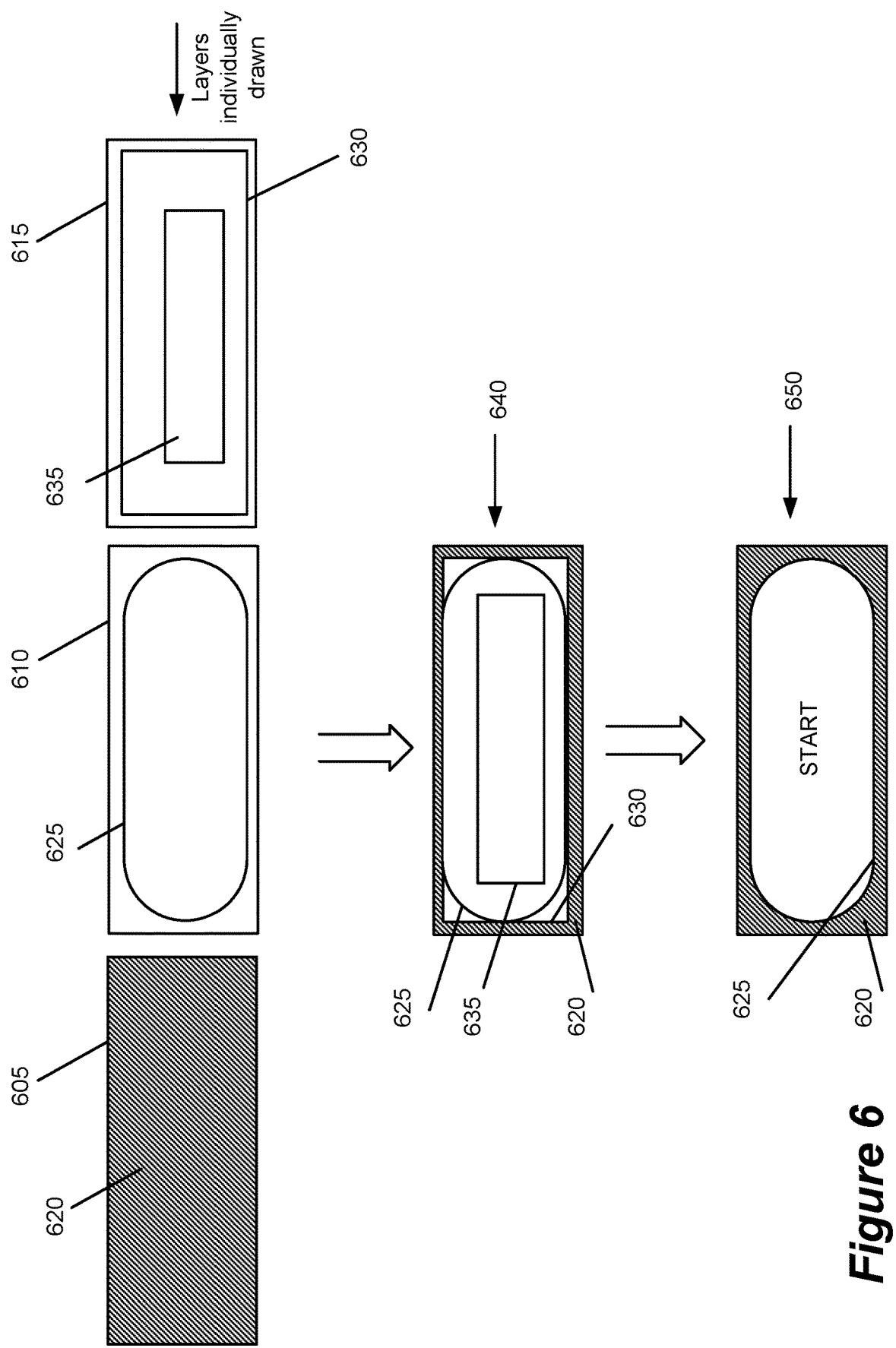
FIG. 6 conceptually illustrates the use of graphical metadata to align elementary graphical assets with text and to identify the boundaries of the elementary assets.

FIG. 6 conceptually illustrates the use of graphical metadata to align elementary graphical asset with text and to identify the visual boundaries of the elementary asset. A pushbutton is used as an example in FIG. 6. As shown, the elementary asset includes several layers 605-615. The first layer 605 includes a drop shadow 620 that is displayed around the pushbutton shape (or layout) at runtime. The second layer 610 includes the graphics for the pushbutton shape 625. As described by reference to FIG. 5 above, an asset image may include several layers and each layer may have multiple renditions of the asset. In addition, an asset may have several layers for different drop shadows and/or highlights. For simplicity, FIG. 6 only shows one layer with one image for the pushbutton shape and one layer for a drop shadow.

The next layer 615 is utilized to include two graphical metadata 630 and 635. Graphical metadata 630 is used to identify the boundaries (i.e., visual edges and corners) of the pushbutton as distinguished from, e.g., the drop shadow around it. As shown in this example, graphical metadata 630 is drawn as a rectangle that closely matches the outer exterior of the pushbutton shape 625.

Layer 615 also includes a second graphical metadata 635 which is used to align text which is displayed on the pushbutton at runtime. Although the example of FIG. 6 shows both graphical metadata 630 and 635 in one layer, some embodiments include each graphical metadata in a separate layer.

FIG. 6 also conceptually illustrates the multi-layered asset artwork 640 stored in the elementary assets library 110. Some embodiments store the multi-layer asset artwork as one or more objects or in one or more files in the library. FIG. 6 also illustrates an example 650 of the pushbutton image as displayed on a graphical user interface of an application 130 at rendering time. In this example the pushbutton asset includes the text "START". The text is aligned with the pushbutton layout 625 by using the graphical metadata 635 which identifies the boundaries of the region for placing the text and places a limit on the size of the text (not to exceed the size of the region 635). Furthermore, the visual boundaries of the pushbutton layout 625 are distinguished from the drop shadow 620 by using graphical metadata 630 which identifies the visual boundaries of the pushbutton layout 625. As shown in FIG. 6, the graphical metadata are not displayed at rendering time.

The pixels in drop shadow 620 and pushbutton shape 625 are parts of the pushbutton image that are rendered on the GUI by a rendering application 130 (shown in FIG. 1). However, the drop shadow is not a critical part of the layout while the pushbutton shape is a critical part which is manipulated by the rendering application 130. Using graphical metadata 630 facilitates identifying the critical part of the pushbutton image from the non-critical parts of the image.

C. Aligning Graphical Assets with Other Graphical Assets

Figure 7:
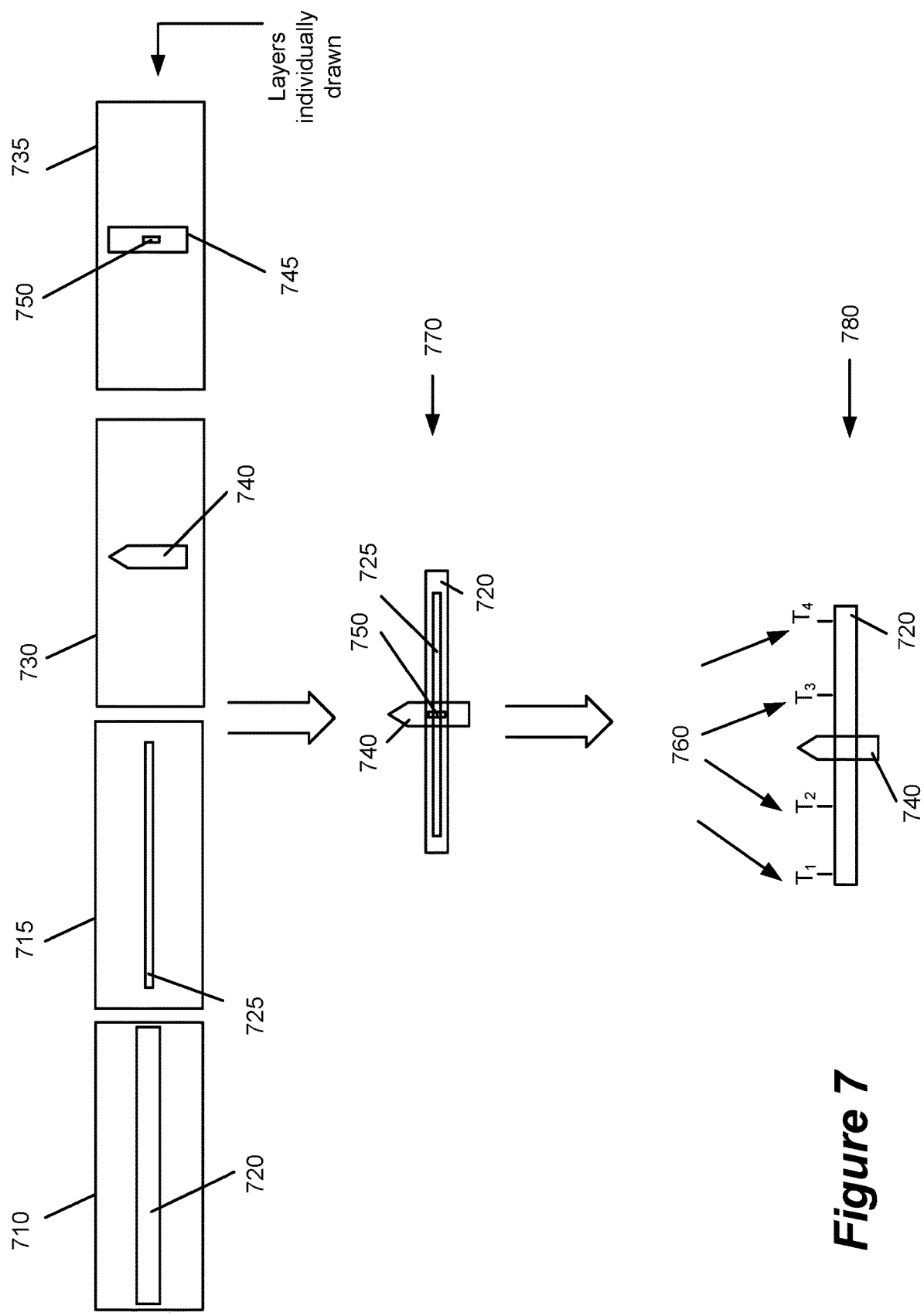
FIG. 7 conceptually illustrates the use of graphical metadata to align elementary graphical assets with other graphical assets and to identify the boundaries of the elementary assets.

FIG. 7 conceptually illustrates the use of graphical metadata to align different elementary assets of a slider asset. As shown, the slider asset includes a track elementary asset and a knob elementary asset. The track elementary asset includes two layers 710 and 715. Layer 710 includes the graphics for the track shape (or layout) 720. Layer 715 includes graphical metadata 725 for aligning the track elementary asset with other elementary assets.

The knob elementary asset also includes two layers 730 and 735. Layer 730 includes the graphics for the knob shape (or layout) 740. Layer 735 includes two graphical metadata 745 and 750. Graphical metadata 745 is used to identify the boundaries of the knob shape. Graphical metadata 750 is used to indicate where to align the knob with other elementary assets. Although the example of FIG. 7 shows both graphical metadata 745 and 750 in one layer, some embodiments include each graphical metadata in a separate layer. Also, as described by reference to FIG. 5 above, an asset image may include several layers and each layer may have multiple renditions of the asset. In addition, an asset may have several layers for different drop shadows and/or highlights. For simplicity, FIG. 7 only shows one layer for each asset image and one layer for graphical metadata of each asset.

FIG. 7 also conceptually illustrates the multi-layered asset artworks 770 for the slider (which includes the knob and the track) stored in the elementary assets library 110. Some embodiments store the multi-layer asset artworks as one or more objects or in one or more files in the library. FIG. 7 also illustrates an example 780 of the artwork asset for the slider as displayed on the graphical user interface of an application 130 at rendering time. In this example, the slider includes ticks 760 and associated texts ($T_1$-$T_4$) which do not require alignment metadata for displaying them.

The knob layout 740 is aligned with the track layout 720 at rendering time by using the two graphical metadata 750 and 725. The two geometries (in this example the two rectangles 750 and 725) are used to determine how to align the two elementary objects. For instance, when the knob is set by the rendering application 130 to a value (such as a value between ticks $T_2$ and $T_3$), the value is calculated and the alignment metadata for the knob and the track are used to display the knob at the new place along the track.

The visual boundaries of the knob layout 740 are distinguished from the surrounding objects by using graphical metadata 745 which identifies the visual boundaries of the knob layout 740. When the knob is displayed at a new position, the graphical metadata 745 is used to display the knob at proper location.

The drawing API 125 may center the alignment region 750 of the knob on the alignment region 725 of the track at the new knob position. Also when the knob reaches the maximum and minimum positions (e.g., at the left most or right most edges of a horizontal track), graphical metadata 725 of the track is used to correctly position the knob layout 740 on the track.

The use of graphical metadata for aligning the elementary assets and identifying the boundaries of the assets has several additional advantages. For instance, the visual appearance of the shape of the knob 740 or the track 720 can change in different renditions of the slider asset without affecting the rendering application 130 or the drawing API modules 125. The drawing API modules 125 can still use graphical metadata 725 and 750 to align the knob and the track. The knob shape can change from e.g., the pointed tip shape to a round shape or the width or thickness of the track can change without a need to make the rendering application or the drawing API aware of the topology of the image as long as the graphical metadata identify the alignment regions and boundaries of the elementary assets.

Furthermore, the same GUI is sometimes rendered on display devices (such as mobile phones) that have different resolutions. In these embodiments, the image of the same asset rendered on a high resolution display has a different number of pixels than the image rendered on a low resolution display. In addition, since more pixels are available for a high resolution display, the asset can be rendered with more details or with a different shape in the high resolution device. Using graphical metadata to identify alignment regions and boundaries of the elementary assets enables the rendering applications 130 to render GUI images on displays of different pixel densities without a need for making the rendering application software code aware of the pixel topology of the image.

IV. SOFTWARE ARCHITECTURE OF THE GRAPHICAL USER INTERFACE DRAWING FRAMEWORK

Figure 8:
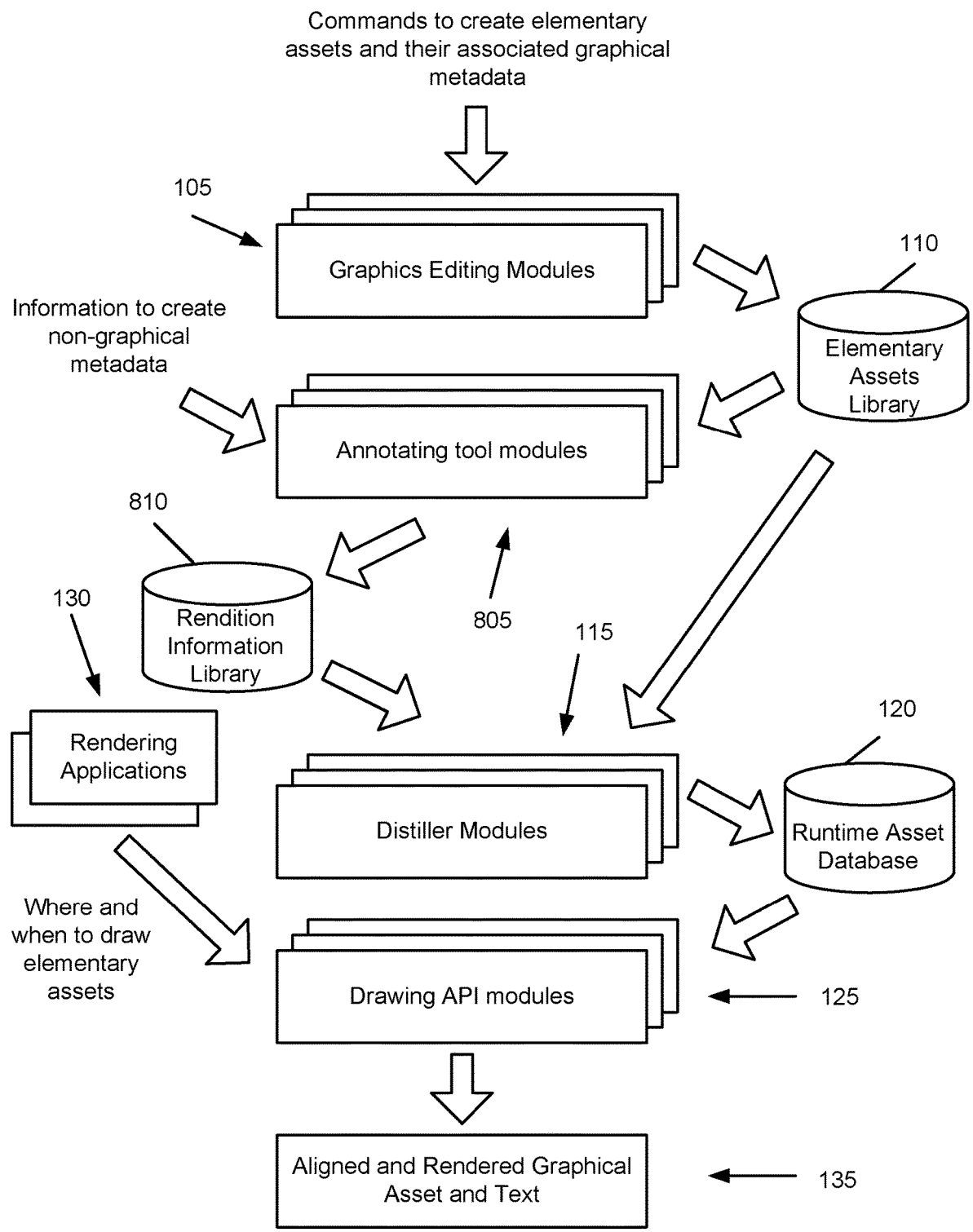
FIG. 8 conceptually illustrates the overall flow of creating and displaying artwork asset in some embodiments.

FIG. 8 conceptually illustrates the overall flow for creating and displaying artwork assets in some embodiments. As shown, the graphics editing tool 105 includes one or more modules which are used to receive instructions and commands from a designer to create elementary assets and their associated graphical metadata. Some embodiments store the elementary assets in an elementary assets library 110.

The annotating tool 805 includes one or more modules for indicating the logical information such as the state of each elementary asset. The annotating tool is used to add metadata that cannot be included in the asset in a graphical form. For instance, for a particular rendition of a checkbox, the annotating tool is used to add metadata to specify whether in this particular rendition the checkbox is on, off, or mixed. The annotating tool is also used to indicate the tint (e.g., blue, yellow, etc.) and the state (e.g., normal, inactive, disabled, etc.) of the checkbox. The output of the annotating tool is stored in the rendition information library 810.

The distiller tool 115 includes one or more modules which are used to retrieve information from the elementary assets library (which includes graphical assets and graphical metadata) and from the rendition information library (which includes non-graphical metadata). The distiller modules in some embodiments analyze the graphical metadata and identify metrics such as the coordinate values for the edges and/or corners of metadata. For instance, the alignment regions are analyzed and a set of coordinate values for the corners of the alignment regions are derived. The edge identifying regions are also analyzed and a set of coordinate values for the corners of the edge identifying regions are derived.

As described above, the distiller tool in some embodiments analyzes the graphical metadata prior to runtime of applications 130 (i.e., prior to the rendering time of the GUI). In other embodiments, the distiller tool is linked to rendering applications 130 and analyzes the graphical metadata during the runtime of applications 130.

At rendering time, one or more applications 130 which are linked to one or more API modules 125, request certain renditions of the graphical assets to be displayed on the display screen for a graphical user interface. The applications identify where and when to draw the elementary assets. The applications also identify the text (if any) that has to be displayed on the asset. The API modules use the information stored in the runtime asset database 120 to display the requested asset artwork 135 on the GUI with proper alignment.

In some embodiments, the distiller modules directly integrate each image with the associated alignment, boundary, and other metadata and store them in the runtime asset database 120 (or pass them to the API modules at rendering time). In some embodiments, the distiller uses the same or similar multi-layer image object to store the graphical image of an asset and its associated graphical metadata as the graphics editing tool does. In these embodiments, the image and the associated metadata are still packaged together as one entity after being processed by the distiller tool. One advantage of this approach is the information for the asset image and the associated metadata are easily distinguishable throughout the process of asset creation and rendering while the image and its associated metadata are still being stored together as one object and/or in one file. Such an approach simplifies retrieving of an asset and identifying the asset's metadata.

Figure 9:
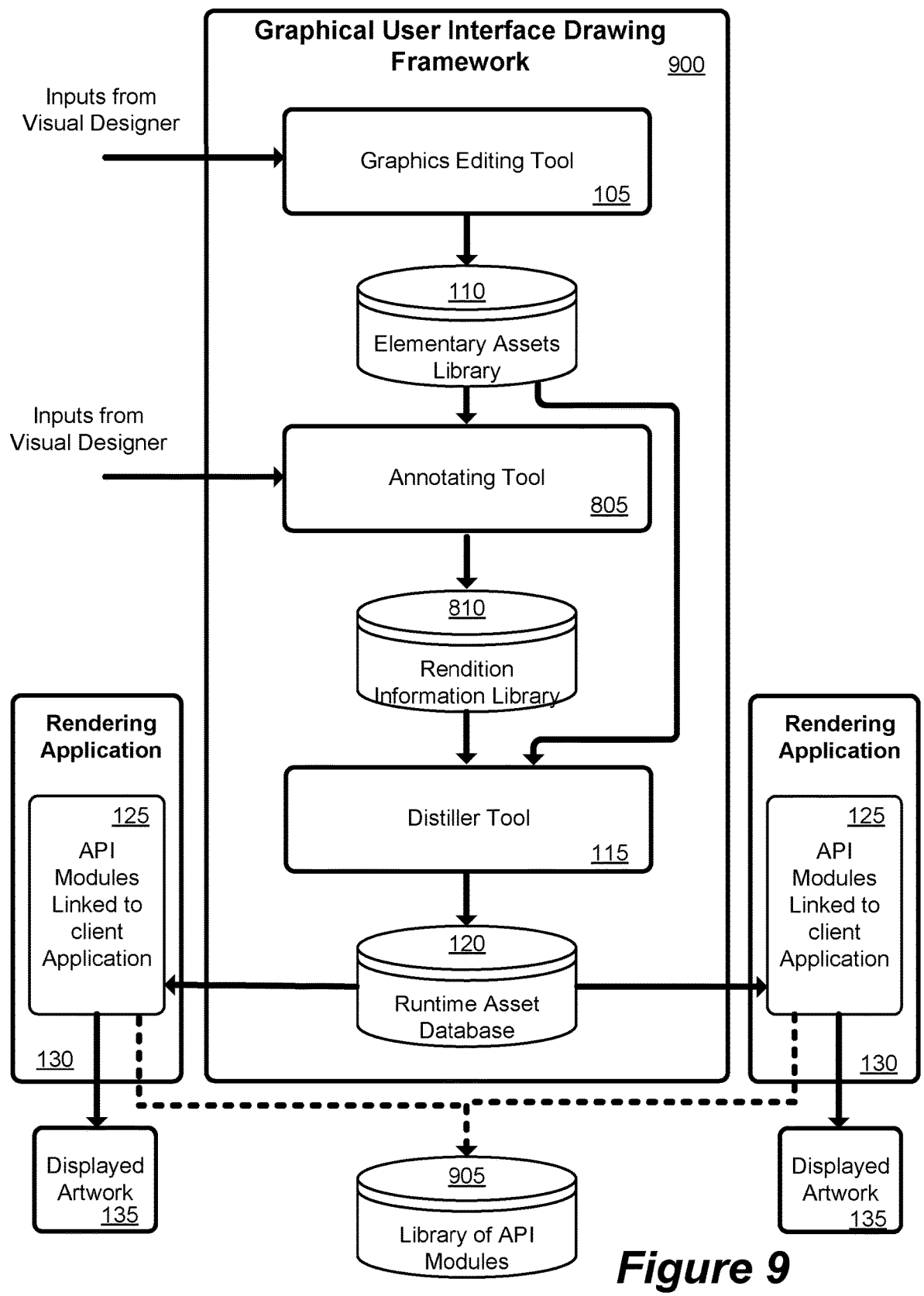
FIG. 9 conceptually illustrates the graphical user interface drawing framework of some embodiments.

In some embodiments, the graphic editing tool, the annotating tool, and the distiller are separate tools in a graphical user interface drawing framework. FIG. 9 conceptually illustrates a graphical user interface drawing framework 900 that includes separate graphics editing tool 105, annotating tool 805, and distiller tool 115. FIG. 9 also shows the elementary assets library 110, the rendition information library 810, and the runtime asset database 120.

As shown, a library 905 of API modules is provided that is used by rendering applications 130 to draw the graphical user interface artwork assets. The rendering applications link (either dynamically or prior to their runtime) to one or more API modules 125. The API modules use the information in the runtime asset database 120 to display the artwork 135 with proper alignment. In some embodiments, the distiller tool 115 is utilized to analyze the graphical metadata prior to runtime of the rendering applications 130 and to store the results in the runtime asset database 120. In other embodiments, the distiller tool is linked to or is invoked by the rendering applications 130 during the runtime of these applications to analyze the graphical metadata. In these embodiments, the distiller tool 115 sends the metrics such as the coordinates of the alignments regions to the API modules 125 instead of or in addition to storing the metrics in the runtime asset database 120.

Figure 10:
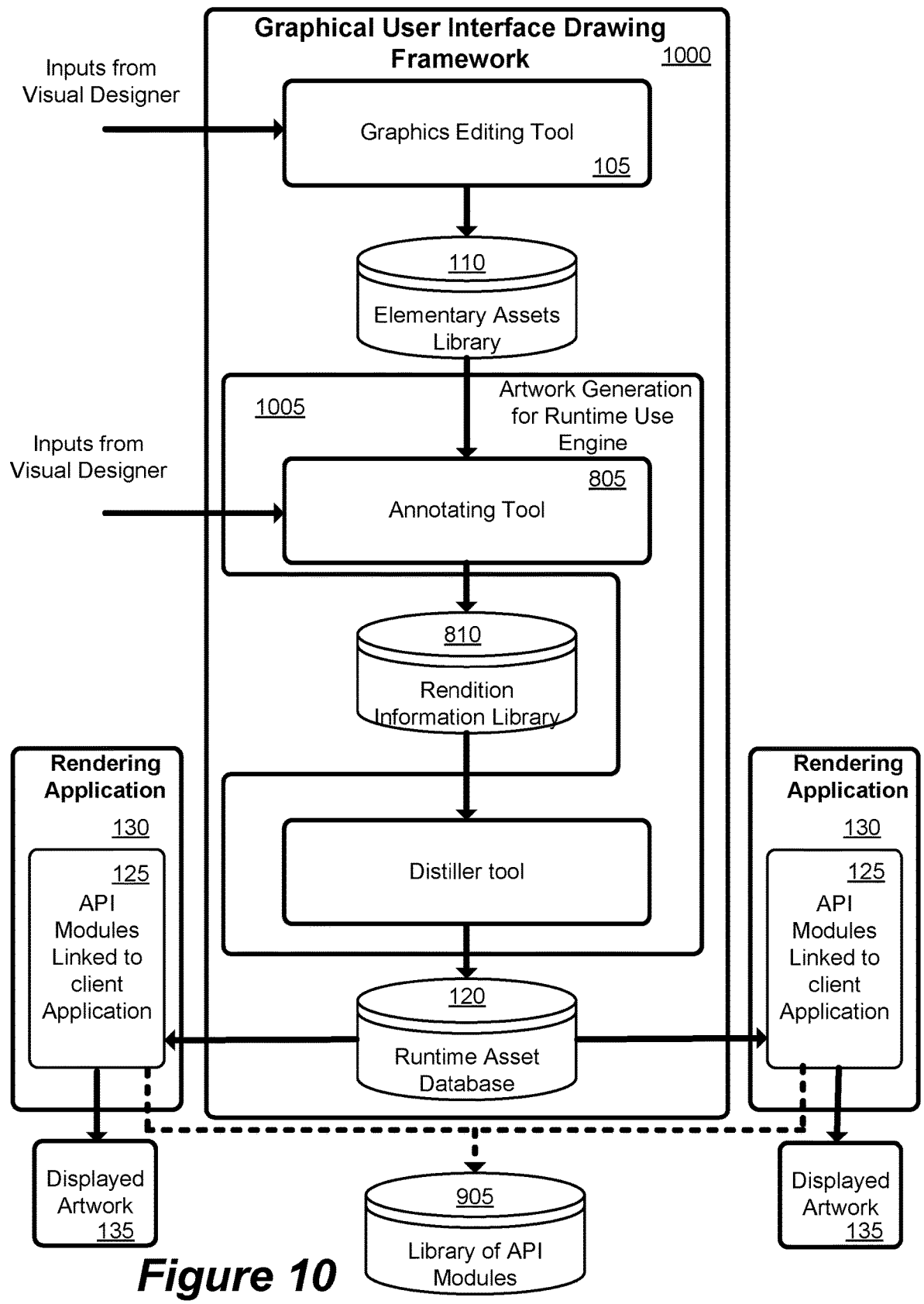
FIG. 10 conceptually illustrates an alternative graphical user interface drawing framework of some embodiments.

FIG. 10 conceptually illustrates an alternative embodiment of a graphical user interface drawing framework 1000 which includes a separate graphics editing tool 105 but packages the annotating tool 805 and the distiller tool together as a part of a runtime-usable artwork generation engine 1005. The runtime-usable artwork generation engine 1005 retrieves elementary assets and their associated graphical metadata from the elementary asset library and generates the rendition information library 810 and the runtime asset database 120. Other entities shown in FIG. 10 are the same as described by reference to FIG. 9.

Figure 11:
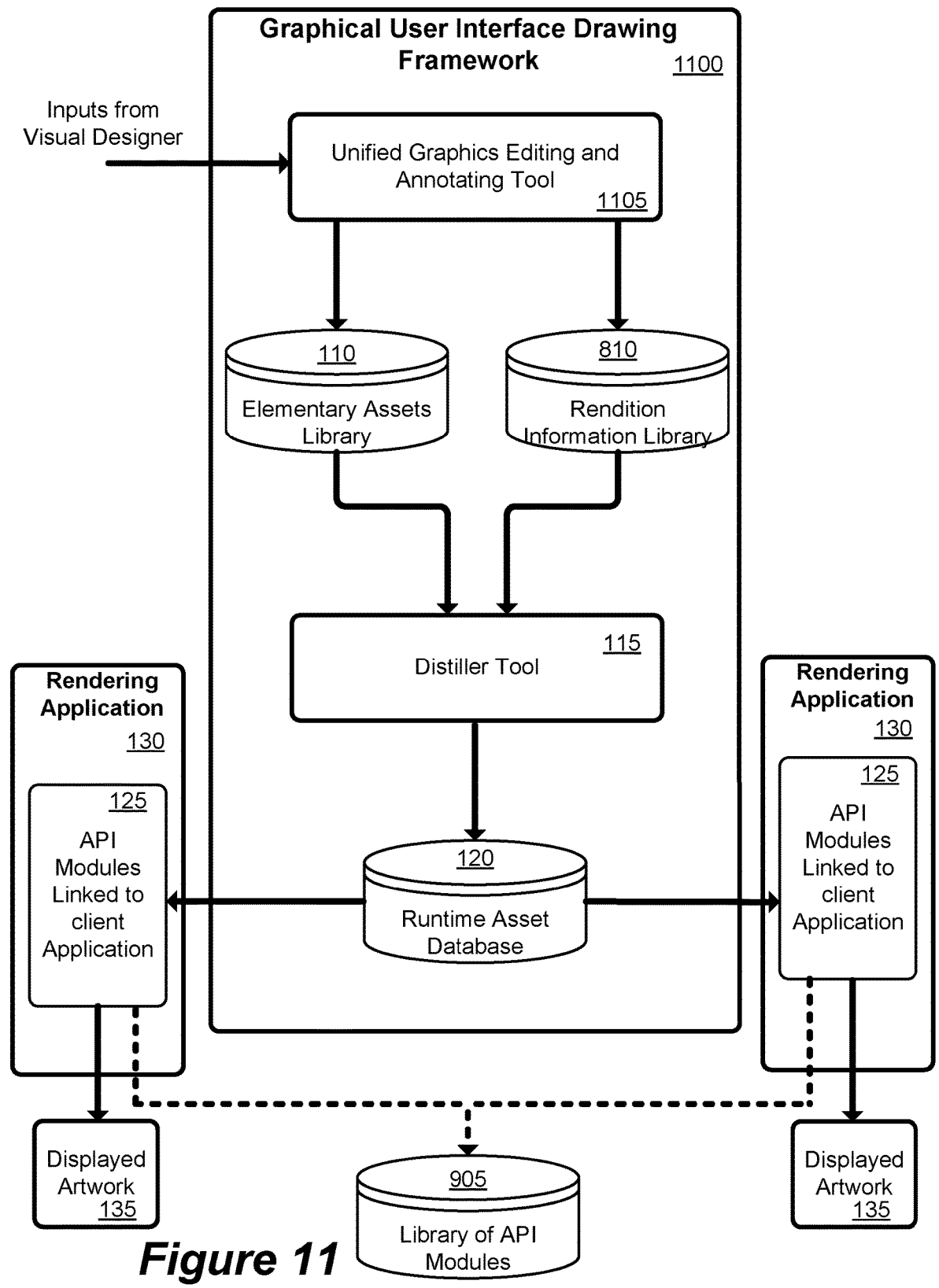
FIG. 11 conceptually illustrates an alternative graphical user interface drawing framework of some embodiments.

FIG. 11 conceptually illustrates yet another embodiment 1100 of the graphical user interface drawing framework. In this embodiment, the graphics editing tool and annotating tool are combined in a unified graphics editing and annotating tool 1105. The distiller tool is provided as a separate tool. In some embodiments, the distiller tool 115 is utilized to analyze the graphical metadata prior to runtime of the rendering applications 130 and to store the results in the runtime asset database 120. In other embodiments, the distiller tool is linked to or is invoked by the rendering applications 130 during the runtime of these applications to analyze the graphical metadata. In these embodiments, the distiller tool 115 sends the metrics such as the coordinates of the alignments regions to the API modules 125 instead of or in addition to storing the metrics in the runtime asset database 120. Other entities shown in FIG. 11 are the same as described by reference to FIG. 9. The following subsections describe, in more detail, the individual components of the graphical user interface frameworks of some embodiments.

Figure 12:
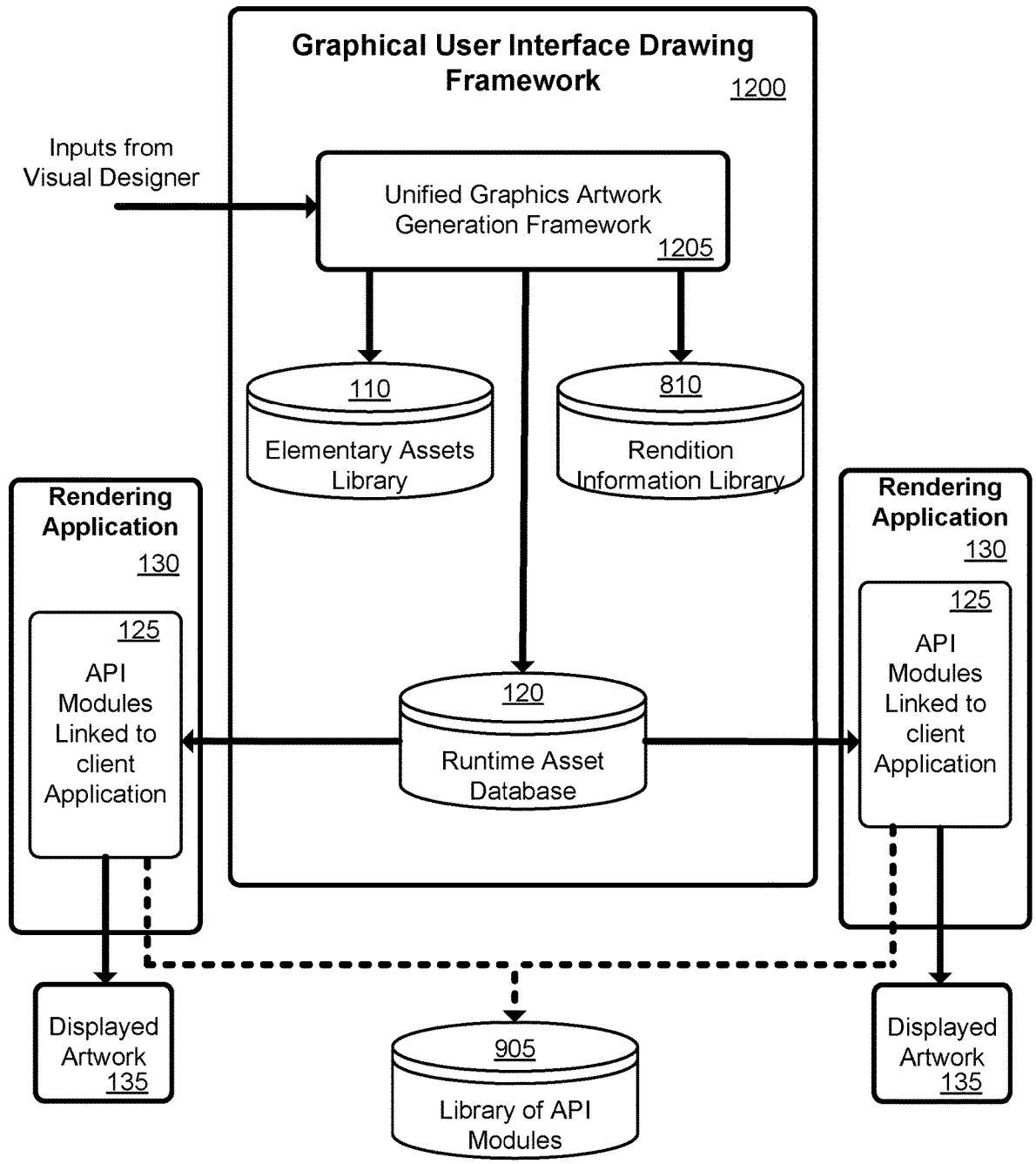
FIG. 12 conceptually illustrates an alternative graphical user interface drawing framework of some embodiments.

FIG. 12 conceptually illustrates yet another embodiment 1200 of the graphical user interface drawing framework. In this embodiment, the graphics editing tool, the annotating tool, and the distiller tool are all combined in a unified graphics artwork generation framework 1205. Generation of the elementary assets library and/or the rendition information library in this embodiment is optional. Other entities shown in FIG. 12 are the same as described by reference to FIG. 9. The following sub-sections describe, in more detail, the individual components of the graphical user interface frameworks of some embodiments.

A. Graphics Editing Tool

Figure 13:
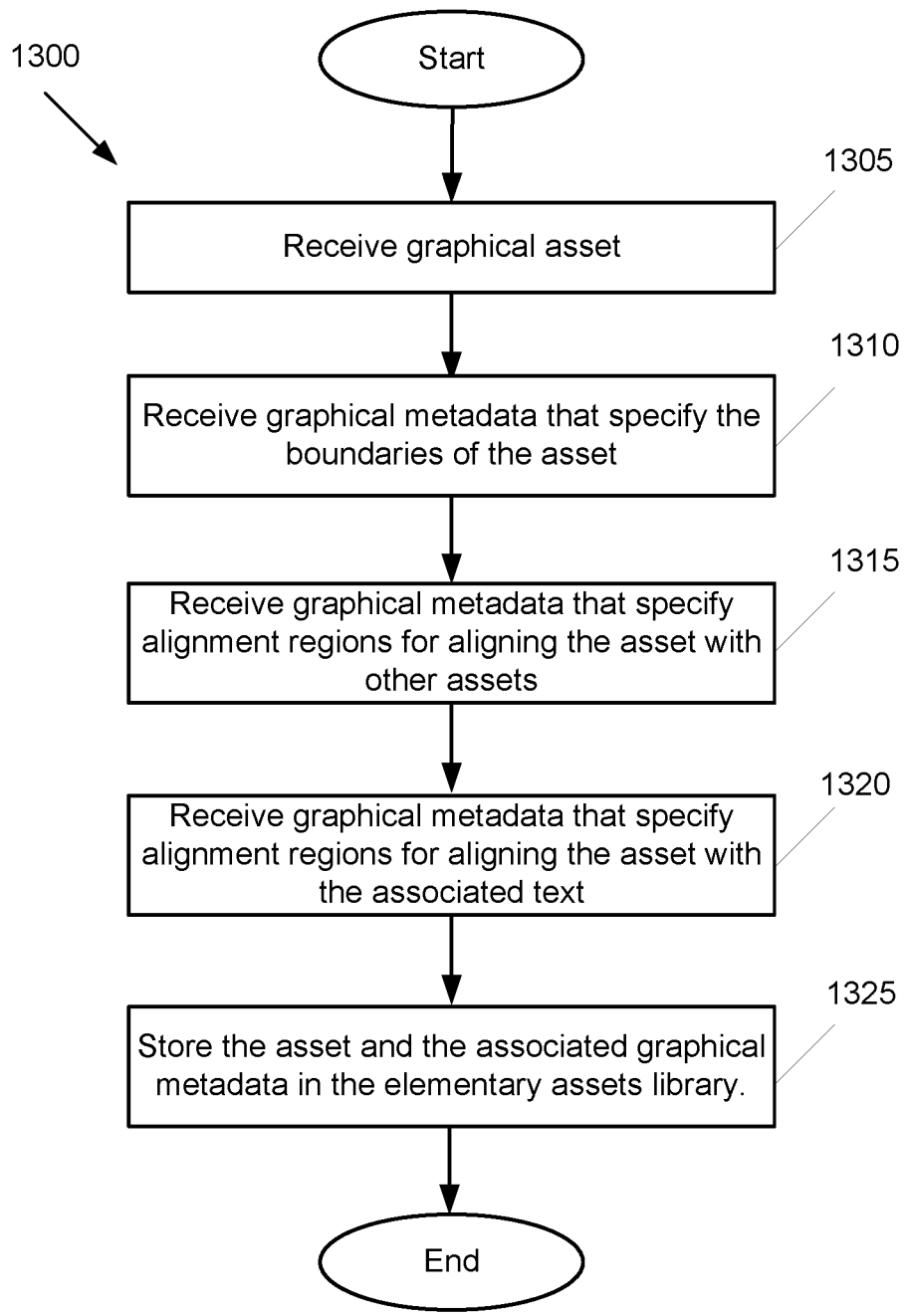
FIG. 13 conceptually illustrates a process for generating an artwork asset in some embodiments.

FIG. 13 conceptually illustrates a process 1300 for generating an artwork asset in some embodiments. This figure is described by reference to FIG. 14 which conceptually illustrates the graphics editing tool 105 of some embodiments. As described above, the graphics editing tool is either a standalone tool or is provided as a part of a unified graphics editing and annotating tool. The graphics editing tool is used by a GUI designer to create graphics assets and their associated graphical metadata.

As shown in FIG. 13, process 1300 receives (at 1305) the assets, e.g., when the asset is drawn by the GUI designer using the graphics editing tool 105 shown in FIG. 14. Next, the process receives the set of graphical metadata associated with each asset. The process receives (at 1310) the graphical metadata that specify the boundaries (i.e., the visual edges and corners) of the asset. For instance, some assets are drawn with different shading overlays and backgrounds. In some embodiments, the boundaries of the assets are identified by a graphical region (such as a rectangle or other geometric shapes) that tightly encloses the asset. The process receives the metadata, e.g., when the graphical metadata is drawn by the GUI designer using the graphics editing tool 105 shown in FIG. 14.

The process then receives (at 1315) graphical metadata that specify regions for aligning the asset with other assets. For instance, in some embodiments control objects (such as a slider and its associated track) that move against each other include graphical metadata that identify alignment regions for aligning the assets. The process receives the metadata, e.g., when the graphical metadata is drawn by the GUI designer using the graphics editing tool 105 shown in FIG. 14.

The process then receives (at 1320) graphical metadata that specify regions for aligning the asset with the associated text. For instance, in some embodiments graphical metadata in the form of a polygon or ellipse are overlaid on an asset to identify the location and/or the size of the text that is displayed on the asset at runtime. The process receives the metadata, e.g., when the graphical metadata is drawn by the GUI designer using the graphics editing tool 105 shown in FIG. 14. Graphical metadata received in operations 1310-1320 are distinguished from non-graphical numeric or alphanumeric metadata in that graphical metadata use a graphical shape (as opposed to alphanumeric strings or numeric values) to visually specify the boundaries, the alignment regions, or other information for the graphical elements.

The process optionally stores (at 1325) the asset and the associated graphical metadata in a graphical assets library 110. In some embodiments (such as the embodiment shown in FIG. 12) where the graphics editing tool is integrated with other components of the graphical user interface drawing framework, the asset and the associated graphical metadata are passed to the other components for further processing with or without storing the assets in the graphical assets library 110.

Although the graphics editing tool is described as a tool that generates multi-layer graphical assets, some embodiments include a graphics editing tool that generates the asset artwork in one layer and tags the graphical alignment regions to identify them as graphical metadata. In these embodiments, the distiller tool is configured to recognize the graphical metadata tags and analyze them to identify the coordinates of the corners and the edges of the alignment regions.

One of ordinary skill in the art will recognize that process 1300 is a conceptual representation of the operations used to generate an artwork asset. The specific operations of process 1300 may not be performed in the exact order shown and described. The specific operations may not be performed in one continuous series of operations, and different specific operations may be performed in different embodiments. Furthermore, the process could be implemented using several sub-processes, or as part of a larger macro process. For instance, a particular asset may not have some or all of the disclosed metadata. Similarly, some embodiments may support different graphical metadata for the assets.

Figure 15:
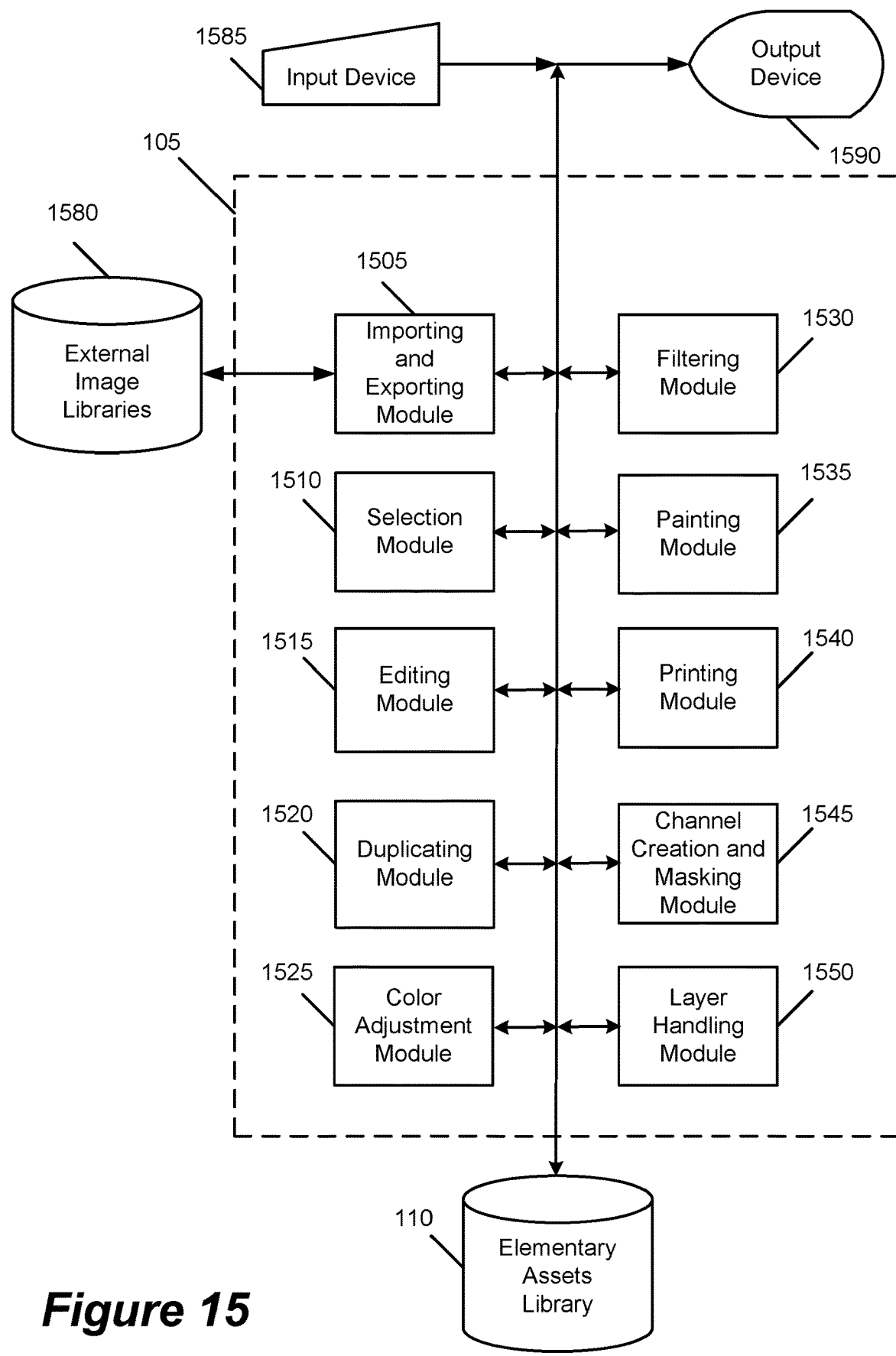
FIG. 15 conceptually illustrates software architecture of the graphics editing tool of some embodiments.

FIG. 15 conceptually illustrates software architecture of the graphics editing tool 105 of some embodiments. As shown, the graphics editing tool 105 includes an importing and exporting module 1505, a selection module 1510, an editing module 1515, a duplicating module 1520, a color adjustment module 1525, a filtering module 1530, a painting module 1535, a printing module 1540, a channel creation and masking module 1545, and a layer handling module 1550.

The above mentioned modules 1505-1550 are available to a graphics designer through an input device 1585 (such as a keyboard and/or a mouse) and an output device 1590 (such as a display screen). The importing and exporting module 1505 enables the graphics designer to import or export images from/to one or more external image libraries 1580. The selection module 1510 provides several tools to select all or portions of images for editing.

The editing module 1515 provides several tools for the graphics designer to edit and retouch images. The duplicating module 1520 allows all or portions of images to be duplicated. The color adjustment module 1525 provides tools for color and tonal adjustment to the images. The filtering module 1530 allows the graphics designer to apply special effects to the images. The painting module 1535 allows changing the color of pixels to create colored areas in the images. The printing module 1540 allows the graphics designer to generated printed copy of the images using an output device 1590 such as a color printer.

The channel creation and masking module 1545 allows the graphics designer to use channels and masks to store color information and manipulate different parts of images. In addition, some embodiments designate certain layers such as a channel layer or a mask layer to create graphical metadata to identify the boundaries of graphical assets and to identify alignment regions for aligning elementary assets with other elementary asset and with text. In these embodiments channel layers or mask layers are not used for their intended purpose of storing color information or manipulate different parts of images and are instead used to store graphical metadata.

Finally, the layer handling module 1550 allows the graphical designer to create a multi-layer image. A multi-layer image includes designated layers for the asset image that will be rendered on the GUI as well as designated layers for graphical metadata. Such an orthogonal approach partitions the image information in such a way that in one hand the graphical metadata is integrated with the image and on the other hand the graphical metadata is easily identifiable and cannot be confused with the pixels that are part of the rendered image. In some embodiments, the output of the graphics editing tool 105 is stored in the elementary assets library 110. In other embodiments, the output of the graphics editing tool is sent to the distiller tool 115 without saving in the elementary assets library.

B. Annotating Tool

Figure 16:
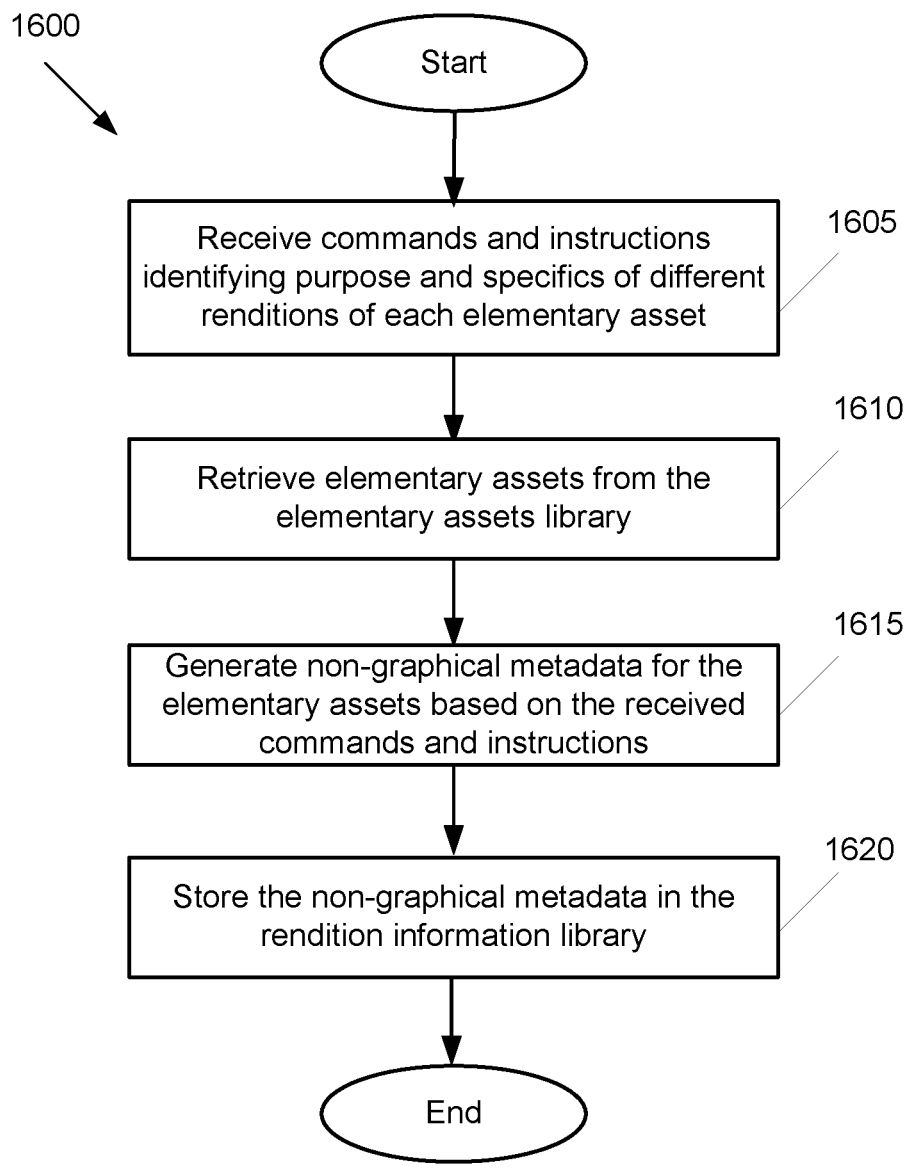
FIG. 16 conceptually illustrates a process for generating non-graphical metadata in some embodiments.
Figure 17:
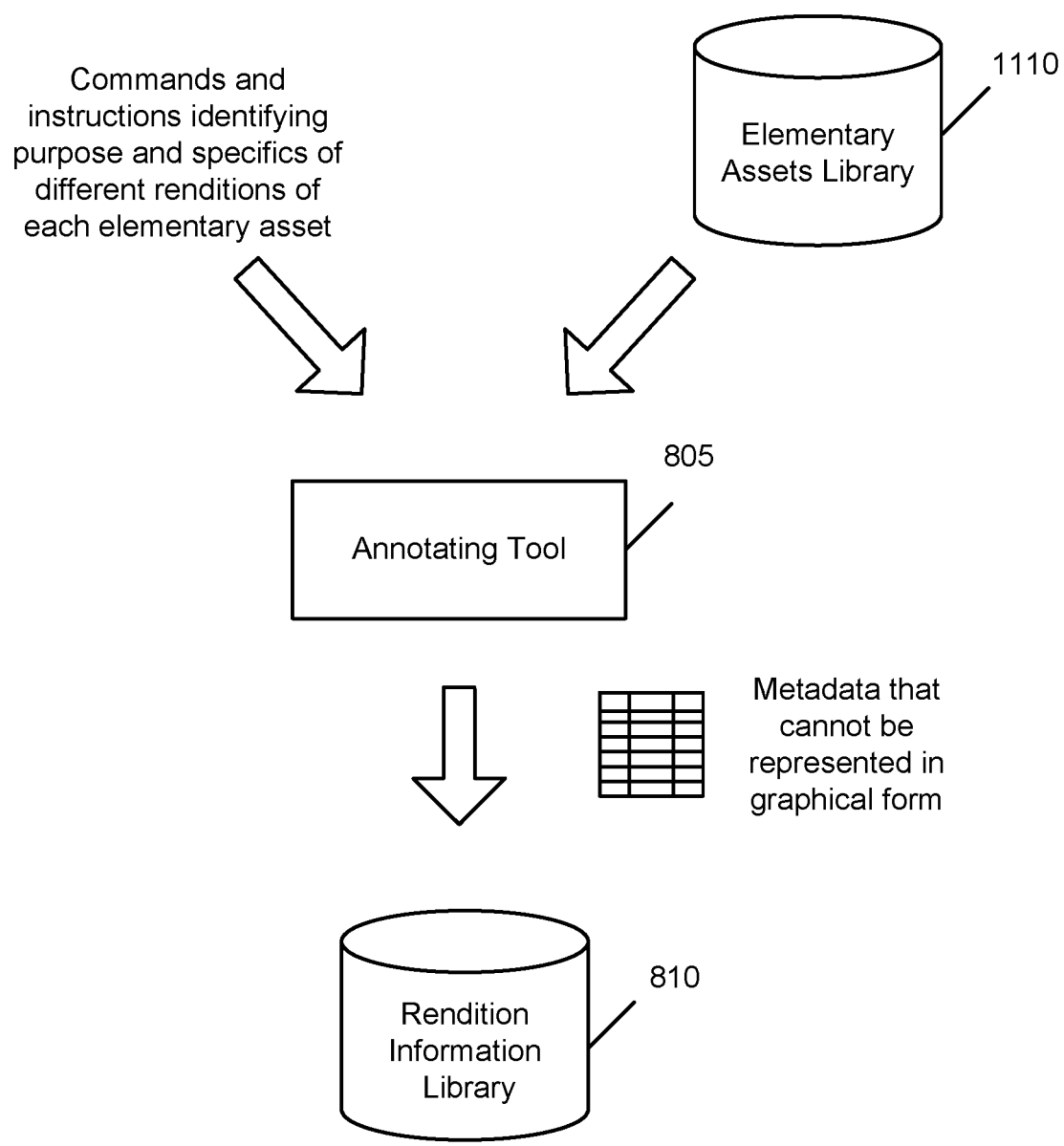
FIG. 17 conceptually illustrates the annotating tool of some embodiments.

FIG. 16 conceptually illustrates a process 1600 for generating non-graphical metadata in some embodiments. This figure is described by reference to FIG. 17 which conceptually illustrates the annotating tool 805 of some embodiments. The annotating tool is used to add metadata (e.g., in the form of alphanumeric values) that cannot be included with the asset in graphical form. For instance, the annotating tool is used to add metadata that identifies the state, tint, and value of each rendition of the elementary assets. As described above by reference to FIGS. 9-12, the annotating tool in different embodiments is a standalone tool, a part of a unified graphics editing and annotating tool, or a part of a runtime artwork generation engine that also includes the distiller tool 115.

As shown in FIG. 16, process 1600 receives (at 1605) commands and instructions (e.g., from a graphics designer or a software programmer) to identify the purpose and specifics of different renditions of each elementary asset. The process retrieves (at 1610) the assets from the elementary assets library 110 shown in FIG. 17. The process generates (at 1615) non-graphical metadata for the elementary assets based on the received commands and instructions to annotate the assets. The process then stores (at 1620) the information in the rendition information library 810. Adding alphanumeric metadata through the annotating tool is different from adding graphical metadata to the artwork using a graphics editing tool. The graphical metadata are included as visual indicators in the artwork, e.g., by using the same graphics editing tool on which the artwork is designed and while the artwork is designed. On the other hand, the alphanumeric metadata using the annotating tool are generated e.g., manually after the artwork design is complete. The use of the annotating tool and the additional alphanumeric metadata is optional in some embodiments.

One of ordinary skill in the art will recognize that process 1600 is a conceptual representation of the operations used to annotate the elementary assets with non-graphical metadata. The specific operations of process 1600 may not be performed in the exact order shown and described. The specific operations may not be performed in one continuous series of operations, and different specific operations may be performed in different embodiments. Furthermore, the process could be implemented using several sub-processes, or as part of a larger macro process. For instance, a particular asset may not have some or all of the disclosed metadata. Similarly, some embodiments may support different graphical metadata for the assets.

Figure 18:
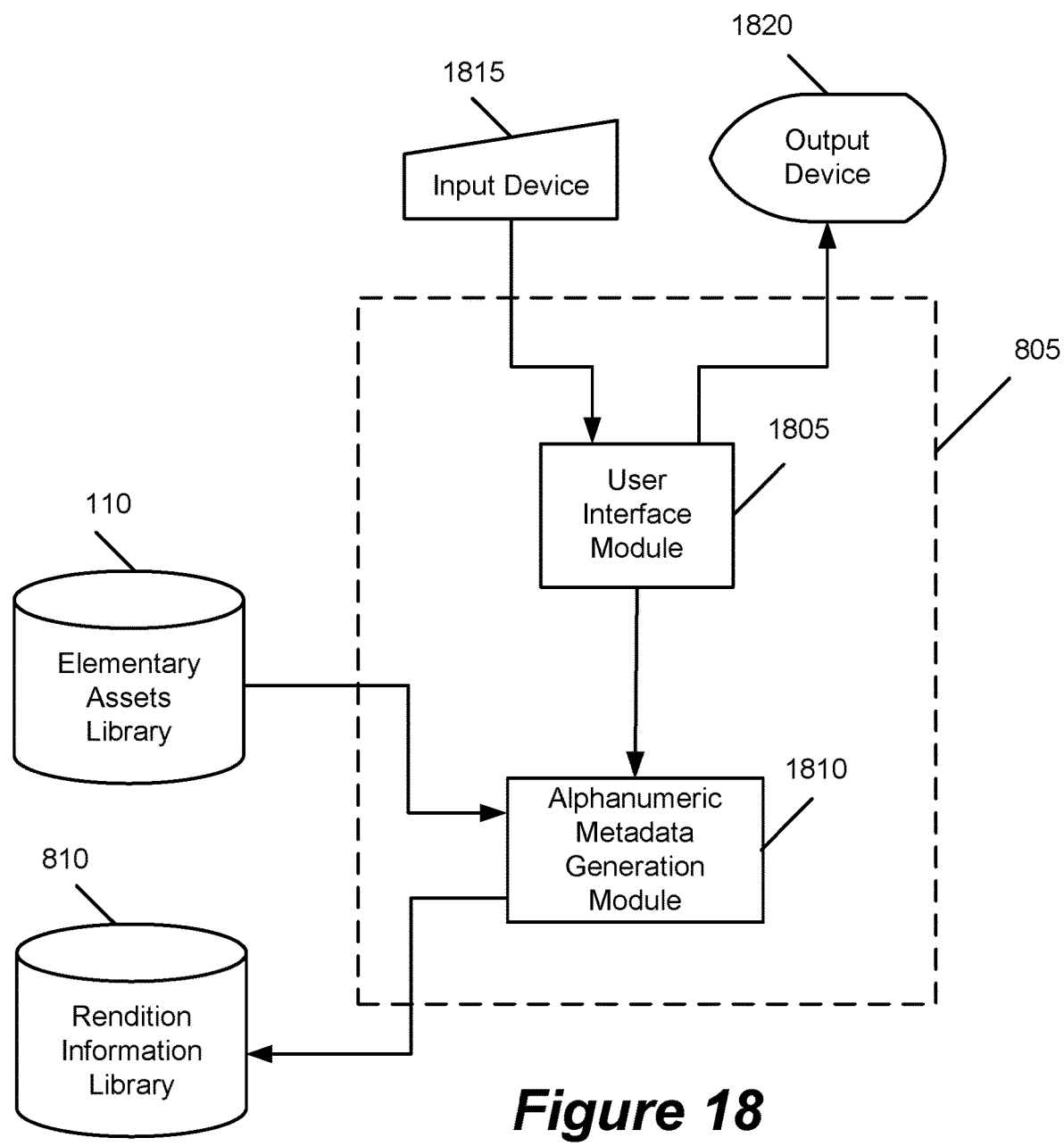
FIG. 18 conceptually illustrates software architecture of the annotating tool of some embodiments.

FIG. 18 conceptually illustrates software architecture of the annotating tool 805 of some embodiments. As shown, the annotating tool includes a user interface module 1805 and an alphanumeric metadata generation module 1810. The user interface module 1805 provides a user interface for receiving commands and instructions from a graphics designer to identify the specifics of different renditions of each elementary asset. The user interface module 1805 interacts with the graphics designer through an input device 1815 (such as a keyboard and/or a mouse) and an output device 1820 (such as a display screen).

The alphanumeric metadata generation module 1810 receives the graphics designer's commands and instructions through the user interface module 1805. The alphanumeric metadata generation module retrieves different renditions of elementary assets from the elementary assets library 110, generates metadata for the elementary assets as specified by the graphics designer, and stores the metadata in the rendition information library 810.

C. Distiller Tool

Figure 19:
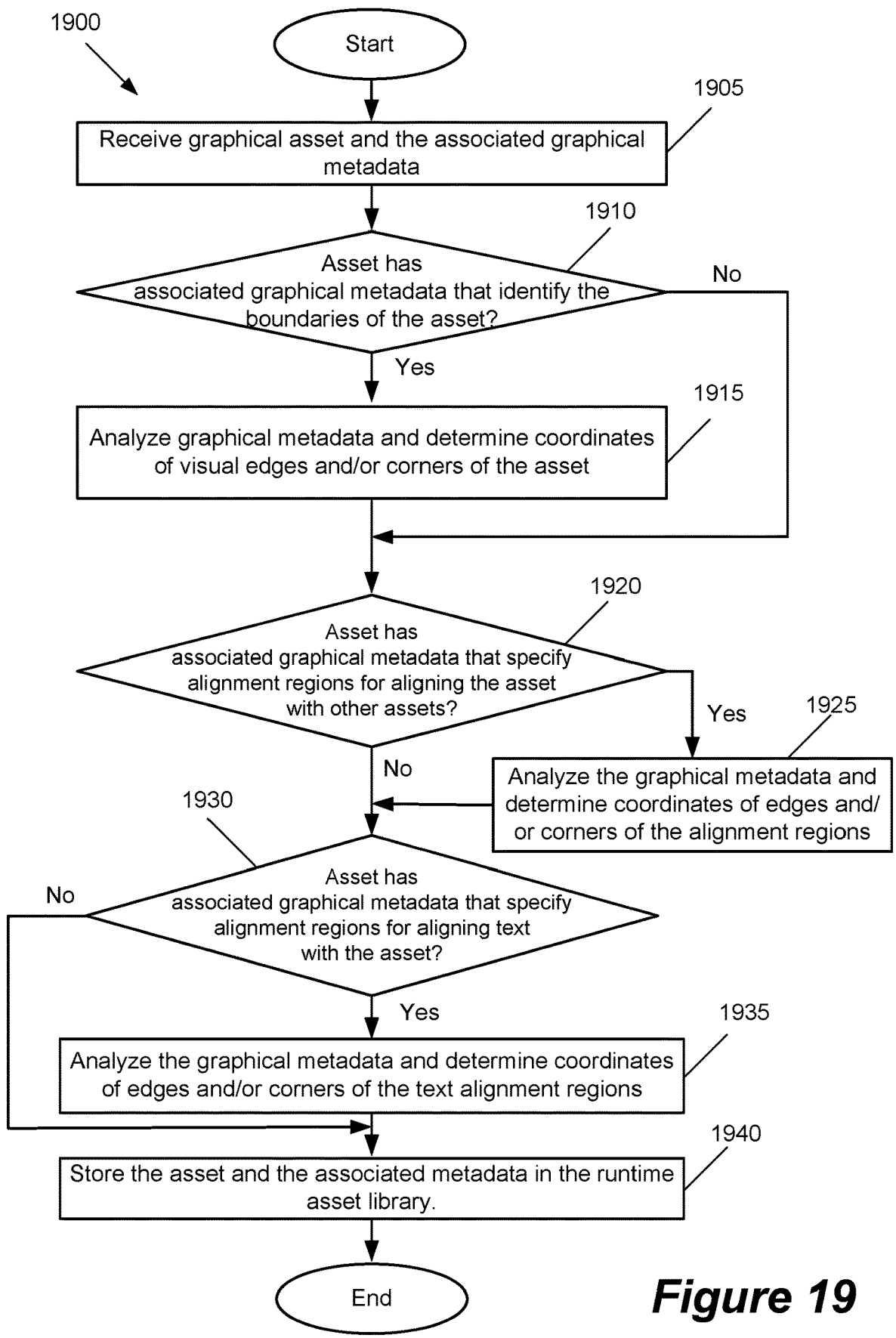
FIG. 19 conceptually illustrates a process for analyzing the graphical metadata associated with an asset and to determine coordinates of the regions specified in the graphical metadata in some embodiments.
Figure 20:
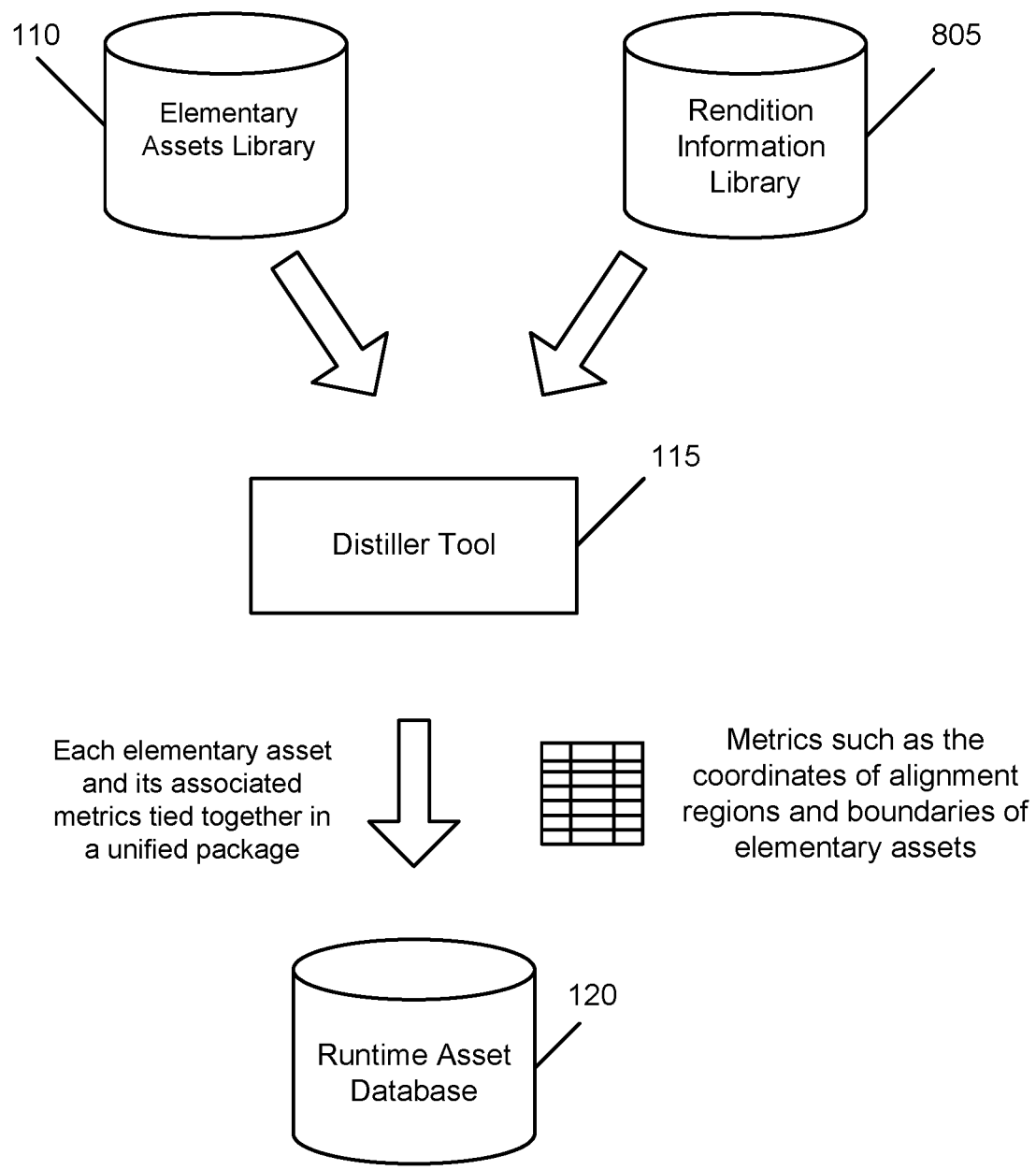
FIG. 20 conceptually illustrates the distiller tool of some embodiments.

FIG. 19 conceptually illustrates a process 1900 for analyzing the graphical metadata associated with an asset and to determine metrics such as coordinates of the regions specified in the graphical metadata in some embodiments. This figure is described by reference to FIG. 20 which conceptually illustrates the distiller tool 115 of some embodiments. As shown in FIG. 19, process 1900 receives (at 1905) the graphical asset and the associated metadata. In some embodiments, the information is retrieved from the elementary assets library 110 and the rendition information library 810 shown in FIG. 20. Next, the process determines (at 1910) whether the asset has associated graphical metadata that identify the boundaries (i.e., the visual edges and corners) of the asset. When the asset does not have such metadata, the process proceeds to 1920 which is described below.

Otherwise, the process analyzes (at 1915) the graphical metadata and determines metrics such as coordinates of visual edges and/or corners of the asset. Next, the process determines (at 1920) whether the asset has associated graphical metadata that specify alignment regions for aligning the asset with other assets. When the asset does not have such metadata, the process proceeds to 1930 which is described below. Otherwise, the process analyzes (at 1925) the graphical metadata and determines metrics such as coordinates of the edges and/or corners of the alignment regions.

Next, the process determines (at 1930) whether the asset has associated metadata that identify the visual edges of the asset. When the asset does not have such metadata, the process proceeds to 1940 which is described below. Otherwise, the process analyzes (at 1935) the graphical metadata and determines metrics such as coordinates of the edges and/or corners of the text alignment regions. Finally, the process optionally stores (at 1940) the asset and the associated metadata (including the determined coordinates of different edges and corners of the regions) in the runtime asset database 120. Specifically, the process ties up (1) different renditions of elementary assets from the elementary assets library 110, (2) the rendition metadata from the rendition information library 810, and (3) coordinates of the edges and corners of the alignment and edge regions and stores the results in the runtime asset database 120. In some embodiments, the distiller tool stores each elementary asset and its associated metrics such as coordinates of the alignment and boundary regions in one object (e.g., a multi-layer object) and/or in one file.

In some embodiments, the distiller tool is used before the runtime of applications 130 (shown in FIG. 1) to generate the runtime asset database 120. In these embodiments, process 1900 stores the asset and the associated metadata in the runtime asset library and the rendering applications (through their APIs) access the runtime asset library during their runtime to display the graphical elements.

In some embodiments, the distiller tool is used at the runtime of applications 130 to analyze and determine the coordinates of different regions specified in the graphical metadata. In these embodiments, the distiller tool is a part of the runtime framework for executing the applications 130. In these embodiments, the runtime framework receives graphical metadata at runtime and utilizes process 1900 to determine the coordinates of the regions specified by the graphical metadata. In some of these embodiments, process 1900 stores the asset and the associated metadata in the runtime asset library for use by the drawings APIs 125 that are linked to the applications 130. In other embodiments, process 1900 passes the coordinate information to the APIs 125 without saving them in the runtime asset library 120.

One of ordinary skill in the art will recognize that process 1900 is a conceptual representation of the operations used to analyze the graphical metadata. The specific operations of process 1900 may not be performed in the exact order shown and described. The specific operations may not be performed in one continuous series of operations, and different specific operations may be performed in different embodiments. Furthermore, the process could be implemented using several sub-processes, or as part of a larger macro process. For instance, a particular asset may not have some or all of the disclosed metadata. Similarly, some embodiments may support different graphical metadata for the assets.

Figure 21:
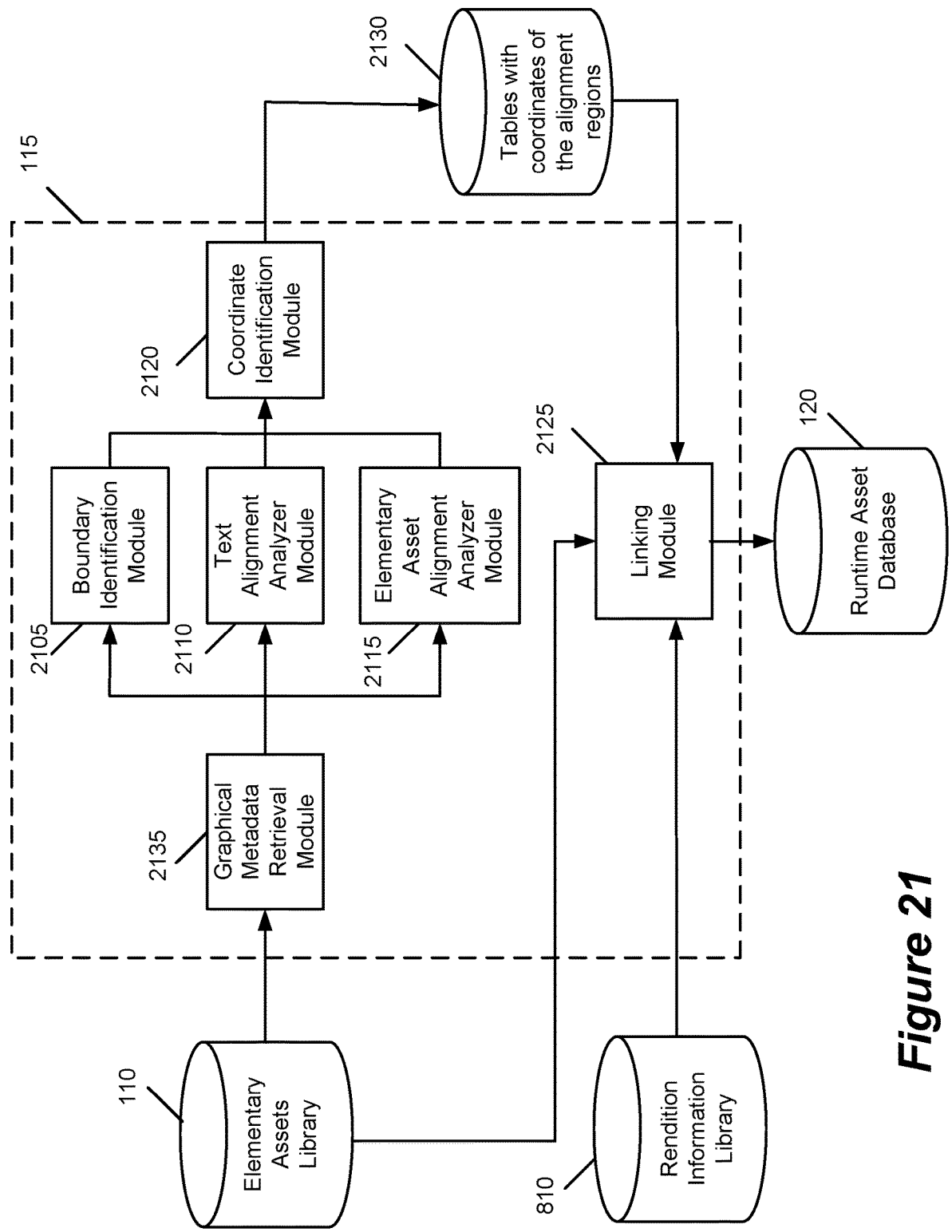
FIG. 21 conceptually illustrates the software architecture of a distiller of some embodiments.

FIG. 21 conceptually illustrates software architecture of the distiller tool 115 of some embodiments. As shown, the distiller tool includes a graphical metadata retrieval module $2135, a boundary identification module 2105, a text alignment analyzer module 2110, an elementary asset alignment analyzer module 2115, a coordinate identification module 2120, and a linking module 2125.

The graphical metadata retrieval module retrieves assets from the elementary assets library 110, extracts the graphical metadata associated with each asset, and passes the graphical metadata to boundary identification module 2105, text alignment analyzer module 2110, and elementary asset alignment analyzer module 2115. Boundary identification module 2105 identifies the graphical metadata that specify the visual boundaries of elementary assets and sends the graphical metadata to the coordinate identification module 2120 for identifying the coordinates of the visual boundaries (i.e., visual edges or visual corners) of the elementary assets.

Text alignment analyzer module 2110 identifies the graphical metadata that specify the text alignment regions. The text alignment analyzer module sends the graphical metadata to the coordinate identification module 2120 for identifying the coordinates of the text alignment regions.

Elementary asset alignment analyzer module 2115 identifies the graphical metadata that specify the elementary asset alignment regions. The text alignment analyzer module sends the graphical metadata to the coordinate identification module 2120 for identifying the coordinates of the elementary asset alignment regions.

Coordinate identification module 2120 receives a graphical metadata representing a region such as visual boundaries of an elementary asset, a text alignment region, or an elementary asset to elementary asset alignment region. The coordinate identification module identifies a set of metrics such as the coordinates of the edges and/or corners of the received region and saves the coordinates (e.g., in a set of tables 2130) as coordinate metadata.

Linking module 2125 ties up each elementary asset with its associated coordinate metadata as well as non-graphical metadata (from the rendition information library 810) and save the information in the runtime asset database 120 for use by API modules at rendering time. In the embodiments that the distiller tool is invoked or is linked to rendering applications 130 at the runtime of the applications, the output of the liking module is used by the drawing APIs during the runtime of the applications 130 to render the images on a graphical user interface.

V. SOFTWARE ARCHITECTURE OF THE RUNTIME DRAWING APPLICATION PROGRAMMING INTERFACE

Figure 22:
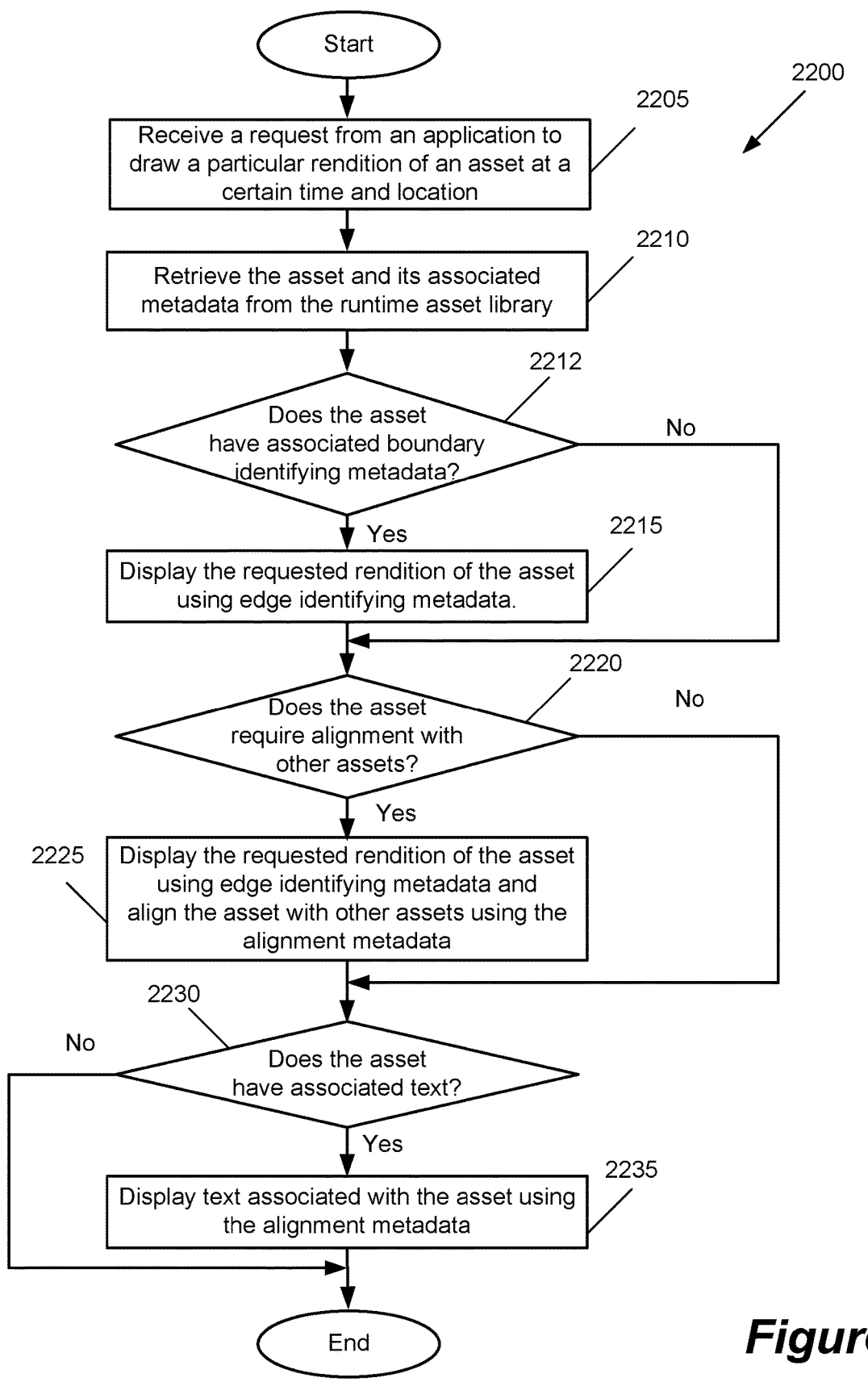
FIG. 22 conceptually illustrates a process for rendering graphical user interface objects in some embodiments.

FIG. 22 conceptually illustrates a process 2200 for drawing (i.e., rendering) graphical user interface objects at runtime in some embodiments. This figure is described by reference to FIG. 23 that conceptually illustrates the drawing API of some embodiments. The API includes a set of modules 125 which are linked to applications 130 either dynamically at the applications' runtime or at the applications' build time. The applications use the API modules to draw the graphical assets for a graphical user interface at runtime. The applications provide a set of parameters such as the identification of a particular rendition of an asset, the location, and the time that the application needs to display a particular asset.

As shown in FIG. 22, the process receives (at 2205) a request from an application to draw as asset. In some embodiments, the requesting application is linked (either at runtime or prior to runtime) to one or more modules 125 from the drawing API. In some embodiments, the requesting application identifies a specific rendition of each asset as well as the time and location where the asset has to be displayed (e.g., display the asset now at the cursor position or at certain coordinates).

Figure 23:
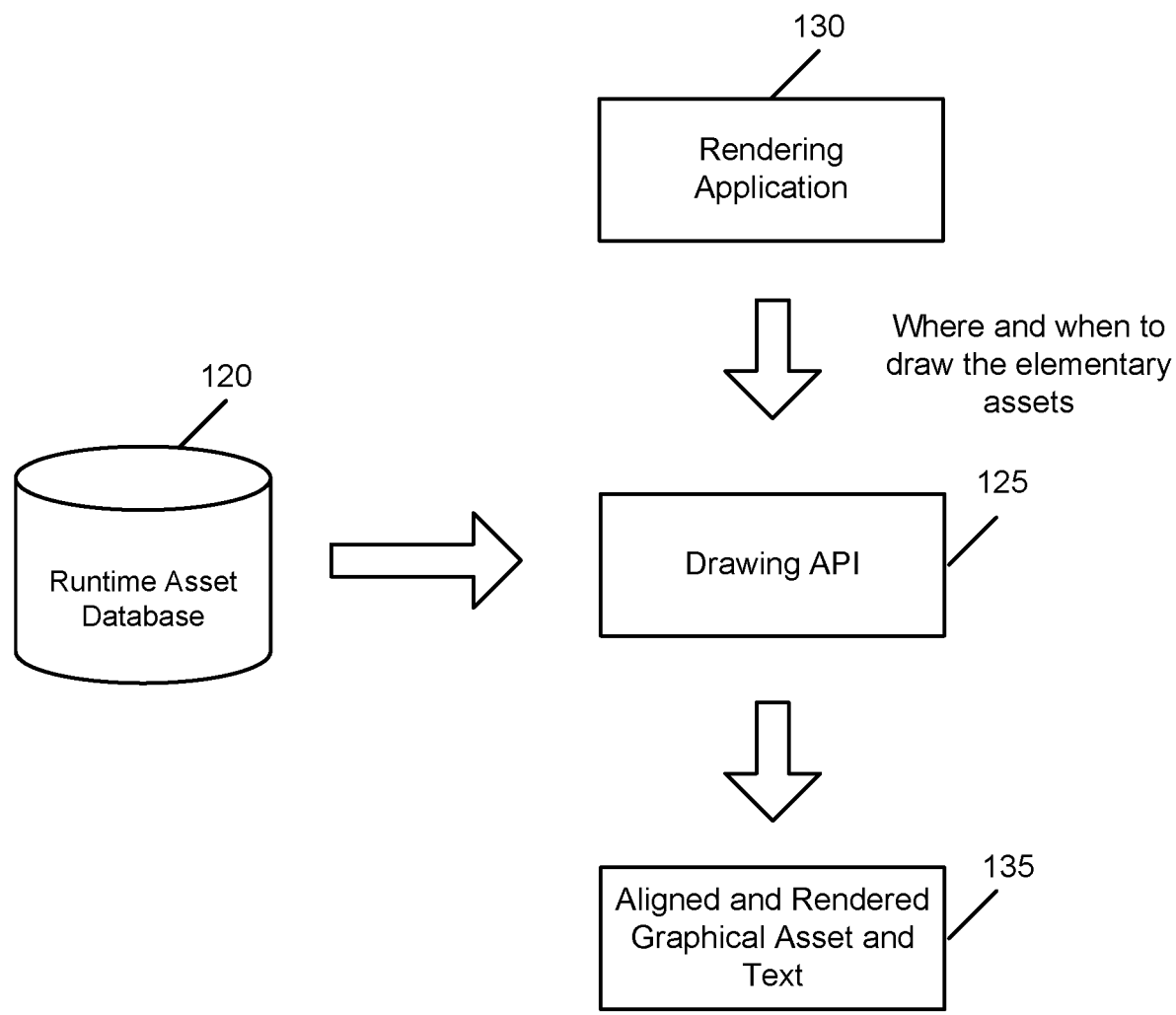
FIG. 23 conceptually illustrates the drawing application programming interface (API) of some embodiments.
Figure 24:
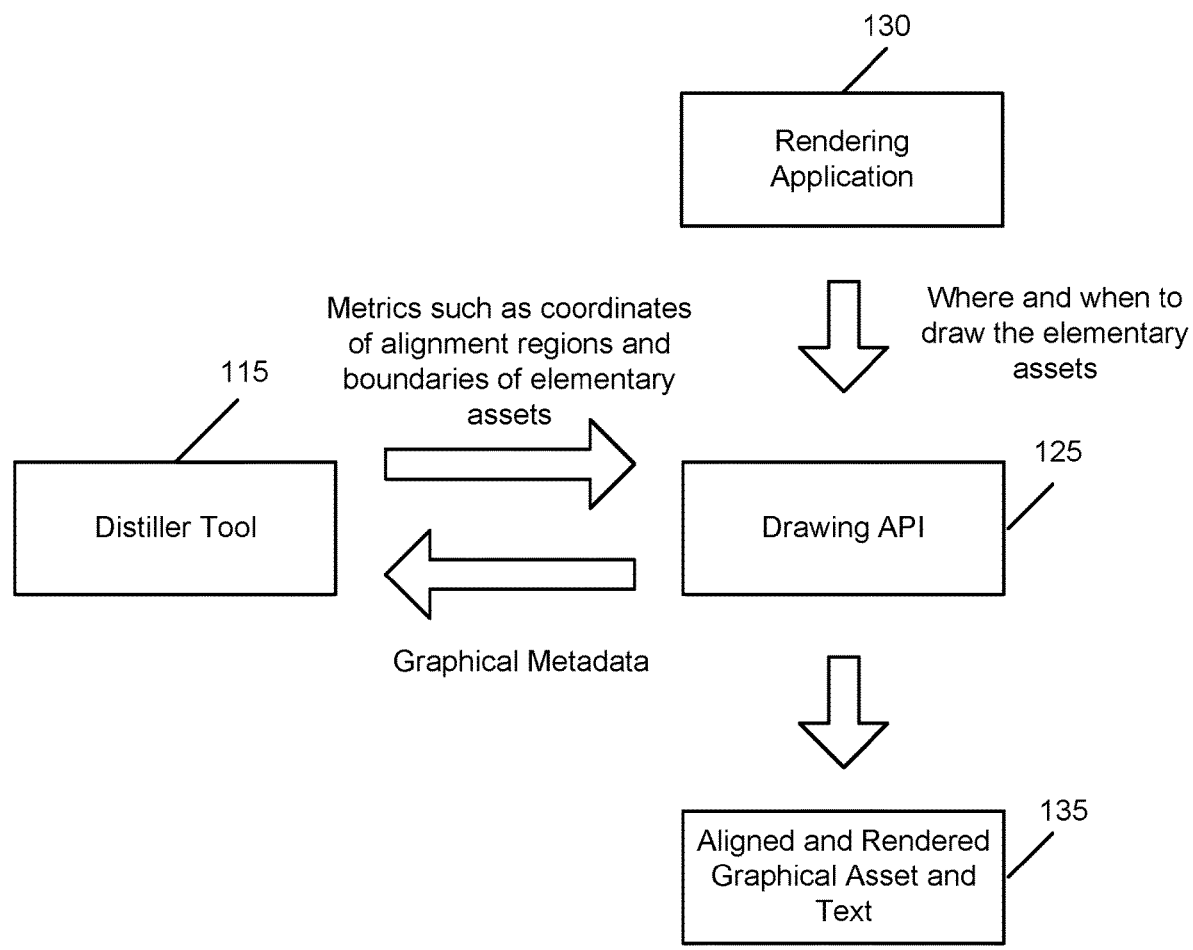
FIG. 24 conceptually illustrates an alternative API of some embodiments.

The process then retrieves (at 2210) the requested asset and its associated metadata from the runtime asset database 120 shown in FIG. 23. As described above, in some embodiments, the distiller tool is a part of runtime framework for rendering the GUI elements. In these embodiments, process 2210 receives the asset and its associated metadata from the distiller tool instead of the runtime asset database. FIG. 24 illustrates an alternative embodiment where the distiller tool 115 is either linked to the rendering application 130 or is invoked at the runtime of the rendering application 130. As shown in FIG. 24, in this embodiment, the distiller tool receives graphical metadata at rendering time (i.e., while the rendering application 130 is being executed). The distiller tool utilizes a process similar to process 1900 to analyze different graphical metadata and to return the coordinates of alignment regions and coordinates of the boundary regions of the elementary assets to the drawing API modules 125.

Referring back to FIG. 22, process 2200 then determines (at 2212) whether the asset has associated boundary identifying metadata. When the asset does not have such metadata, the process proceeds to 2220 which is described below. Otherwise, the process displays (at 2215) the asset at the requested location using the boundary identifying metadata.

The process then determines (at 2220) whether the asset has to be aligned with other assets. In some embodiments, the process makes the determination based on the type of the asset (e.g., when the asset is a slider), based on whether the asset overlaps or intersects another assets, and/or whether the asset includes graphical alignment metadata. When the asset does not require alignment, the process proceeds to 2230 which is described below. Otherwise, when the asset requires alignment with other assets, the process displays (at 2225) the requested rendition of the asset by aligning the asset with other assets using the alignment metadata. If the asset includes edge identifying metadata, the process uses the metadata for displaying the asset.

Next, the process determines (at 2230) whether the asset does not have associated text, the process exits. Otherwise, the process uses the alignment metadata to align the text with the asset. The process then exits.

One of ordinary skill in the art will recognize that process 2200 is a conceptual representation of the operations used to generate an artwork asset. The specific operations of process 2200 may not be performed in the exact order shown and described. The specific operations may not be performed in one continuous series of operations, and different specific operations may be performed in different embodiments. Furthermore, the process could be implemented using several sub-processes, or as part of a larger macro process. For instance, a particular asset may not have some or all of the disclosed metadata. Similarly, some embodiments may support different graphical metadata for the assets.

Figure 25:
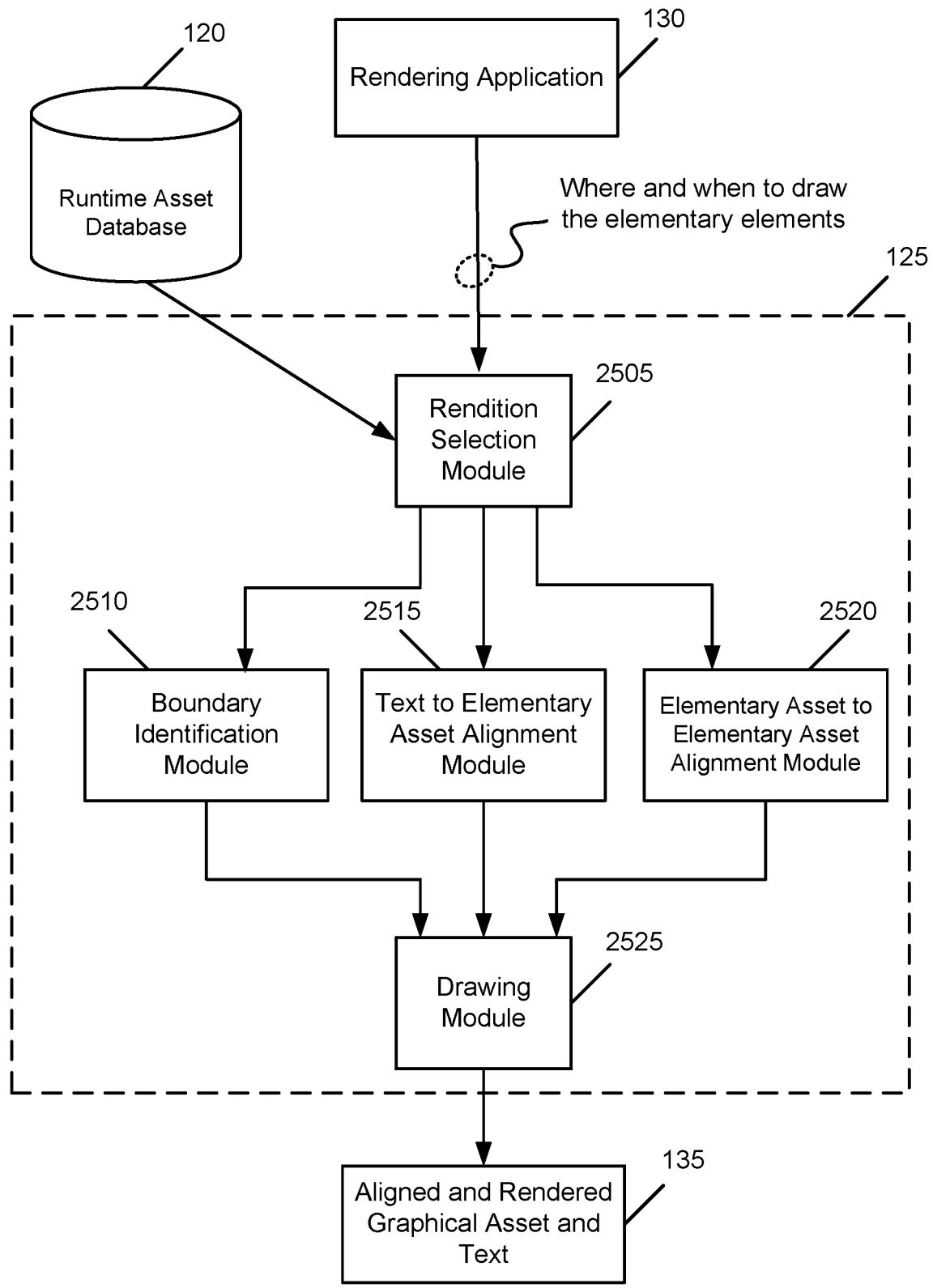
FIG. 25 conceptually illustrates the software architecture of the API of some embodiments.

FIG. 25 conceptually illustrates software architecture of the API modules 125 of some embodiments. As shown, the API modules include a rendition selection module 2505, a boundary identification module 2510, a text to elementary asset alignment module 2515, an elementary asset to elementary asset alignment module 2520, and a drawing module 2525.

The rendition selection module receives an identification of a particular rendition of an elementary asset from the rendering application 130 that is linked to the API modules. The rendition selection module also receives other parameters such as the time and location for displaying the asset from the application program. If the elementary asset has an associated text for display, the rendition selection module also receives the text from the rendering application. The rendition selection module retrieves information about the particular elementary asset from the runtime asset database 120 and passes the information along with the other parameters received from the rendering application to boundary identification module 2510, text to elementary asset alignment module 2515, and elementary asset to elementary asset alignment module 2520. In the embodiments that the distiller tool 115 is a part of the runtime rendering framework, rendition selection library retrieves the information about the particular elementary asset from the distiller tool (not shown in FIG. 25) instead of the runtime asset database.

Boundary identification module 2510 uses the boundary identification metadata and provides the coordinates of the visual edges and corners of the elementary asset to the drawing module 2525. Text to elementary asset alignment module 2515 uses the text alignment metadata and provides the coordinates of the region where the text associated to the elementary asset has to be displayed to the drawing module 2525.

Elementary asset to elementary asset alignment module 2520 uses the elementary asset alignment metadata and provides the coordinates of the alignment region of the elementary asset to the drawing module 2525. The drawing module 2525 uses the information received from edge identification module 2510, text to elementary asset alignment module 2515, and elementary asset to elementary asset alignment module 2520 and displays the elementary asset 135 with proper alignments. If the elementary asset has associated text, the drawing module displays the text using the text alignment metadata.

VI. COMPUTER SYSTEM

Many of the above-described tools, processes, methods, and functionalities are implemented as software processes that are specified as a set of instructions recorded on a computer readable storage medium (also referred to as computer readable medium). When these instructions are executed by one or more computational or processing unit (s) or element(s) (such as processors or other computational elements like ASICs and FPGAs), they cause the computational element(s) to perform the actions indicated in the instructions. Computer is meant in its broadest sense, and can include any electronic device with computational element. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 26:
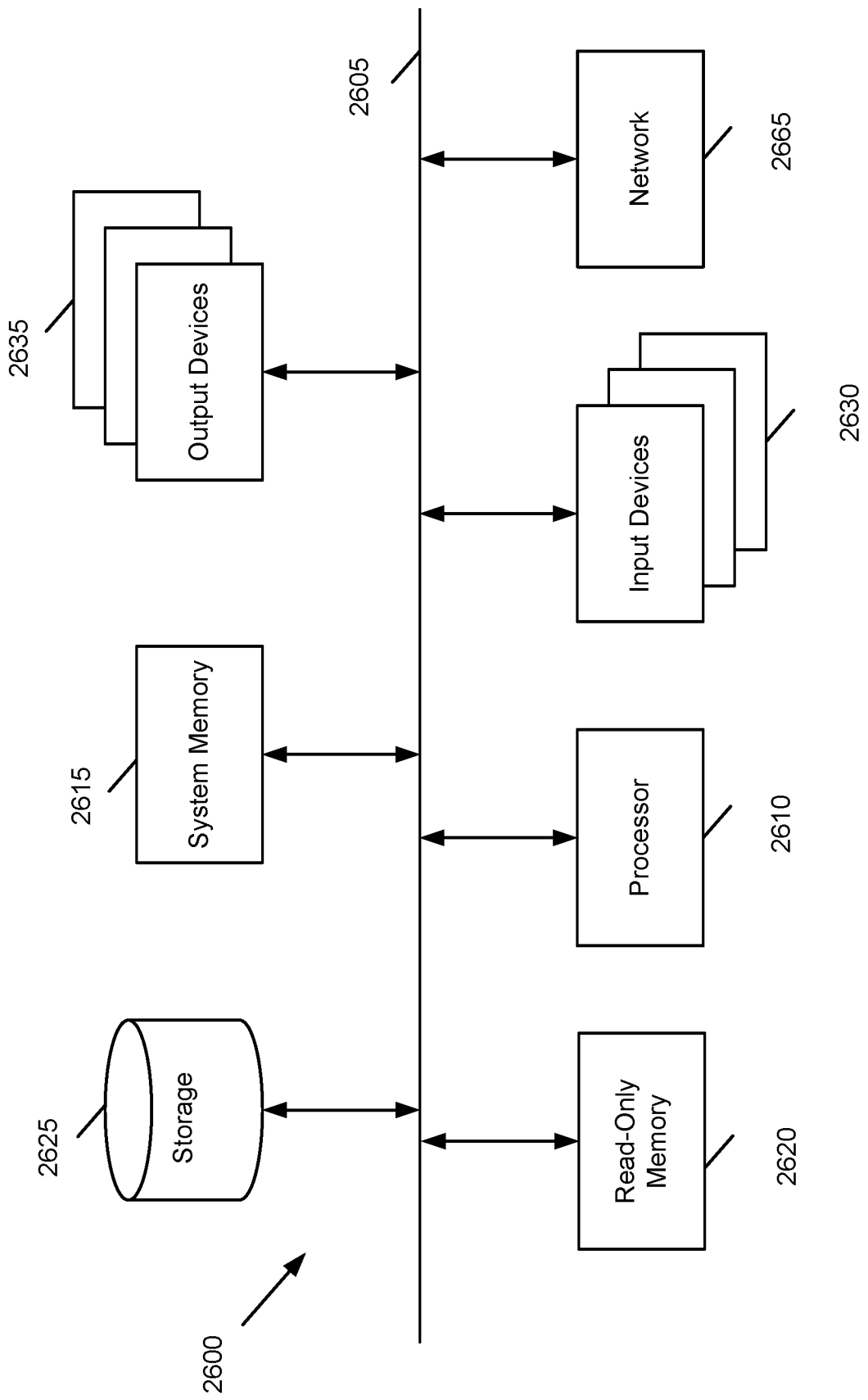
FIG. 26 conceptually illustrates a computer system with which some embodiments are implemented.

FIG. 26 conceptually illustrates a computer system with which some embodiments of the invention are implemented. The computer system 2600 includes a bus 2605, a processor 2610, a system memory 2615, a read-only memory 2620, a permanent storage device 2625, input devices 2630, and output devices 2635.

The bus 2605 collectively represents all system, peripheral, and chipset buses that support communication among internal devices of the computer system 2600. For instance, the bus 2605 communicatively connects the processor 2610 with the read-only memory 2620, the system memory 2615, and the permanent storage device 2625.

From these various memory units, the processor (or processing unit) 2610 retrieves instructions to execute and data to process in order to perform the processes of the invention. In some embodiments the processor comprises a Field Programmable Gate Array (FPGA), an ASIC, or various other electronic components for executing instructions. The read-only-memory (ROM) 2620 stores static data and instructions that are needed by the processor 2610 and other modules of the computer system. The permanent storage device 2625, on the other hand, is a read-and-write memory device. This device is a non-volatile memory unit that stores instruction and data even when the computer system 2600 is off. Some embodiments of the invention use a mass-storage device (such as a magnetic or optical disk and its corresponding disk drive) as the permanent storage device 2625. Some embodiments use one or more removable storage devices (flash memory card or memory stick) as the permanent storage device.

Like the permanent storage device 2625, the system memory 2615 is a read-and-write memory device. However, unlike storage device 2625, the system memory is a volatile read-and-write memory, such as a random access memory. The system memory stores some of the instructions and data that the processor needs at runtime.

Instructions and/or data needed to perform processes of some embodiments are stored in the system memory 2615, the permanent storage device 2625, the read-only memory 2620, or any combination of the three. For example, the various memory units include instructions for processing multimedia items in accordance with some embodiments. From these various memory units, the processor 2610 retrieves instructions to execute and data to process in order to execute the processes of some embodiments.

The bus 2605 also connects to the input and output devices 2630 and 2635. The input devices enable the user to communicate information and select commands to the computer system. The input devices 2630 include alphanumeric keyboards and cursor-controllers. The output devices 2635 display images generated by the computer system. The output devices include printers and display devices, such as cathode ray tubes (CRT) or liquid crystal displays (LCD). Finally, as shown in FIG. 26, bus 2605 also couples computer 2600 to a network 2665 through a network adapter (not shown). In this manner, the computer can be a part of a network of computers (such as a local area network (LAN), a wide area network (WAN), or an Intranet) or a network of networks (such as the Internet).

Any or all of the components of computer system 2600 may be used in conjunction with the invention. For instance, some or all components of the computer system described with regards to FIG. 26 comprise some embodiments of the systems described above. However, one of ordinary skill in the art will appreciate that any other system configuration may also be used in conjunction with the invention or components of the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory machine readable medium storing a graphical user interface (GUI) framework, the GUI framework executable by at least one processing unit, the GUI framework comprising sets of instructions for:
   receiving a set of graphical assets for rendering as an image;
   receiving a set of graphical drawings not to be rendered in preparing the image, the set of graphical drawings specifying alignment information for rendering the set of graphical assets in the image; and
   storing the graphical assets and the graphical drawings that are not to be rendered in an image file, wherein the graphical assets stored in the image file are rendered and positioned according to a set of coordinates derived from geometric shapes represented in the set of graphical drawings automatically at runtime based on the alignment information specified by the set of graphical drawings stored in the image file.

2. The non-transitory machine readable medium of claim 1, the GUI framework further comprising sets of instructions for:
   receiving annotations to at least one graphical asset after the graphical assets in the image file have been rendered;
   retrieving the at least one graphical asset from the image file;
   generating non-graphical metadata for one or more elementary assets of the at least one graphical asset based on the annotations; and
   storing the non-graphical metadata with the image file.

3. The non-transitory machine readable medium of claim 1, the GUI framework further comprising a set of instructions for analyzing the graphical drawings and identifying a second set of coordinates for one or more alignment regions used to align at least one of the graphical assets with other graphical assets, wherein the other graphical assets are not stored to the image file.

4. The non-transitory machine readable medium of claim 1, the GUI framework further comprising a set of instructions for analyzing the graphical drawings and identifying a second set of coordinates for one or more alignment regions used to align at least one of the graphical assets with associated text.

5. The non-transitory machine readable medium of claim 1, wherein the image file is stored as a multi-layer image file comprising a first set of layers comprising the set of graphical assets and a second set of layers comprising the set of graphical drawings.

6. The non-transitory machine readable medium of claim 5, wherein the first set of layers comprise one or more layers comprising drop shadows for display with one or more of the graphical assets.

7. The non-transitory machine readable medium of claim 5, wherein the first set of layers comprise one or more layers comprising highlights for one or more of the graphical assets.

8. The non-transitory machine readable medium of claim 1, wherein the set of graphical drawings comprises a geometric shape specifying a visual boundary for rendering one or more of the graphical assets.

9. The non-transitory machine readable medium of claim 1, wherein at least one of the graphical assets is associated with a set of shadows, wherein the graphical assets are rendered by using a geometric shape to render at least one of the graphical assets against the set of shadows.

10. The non-transitory machine readable medium of claim 1, wherein the set of graphical drawings comprises a geometric shape specifying a maximum size for text rendered on the graphical assets.

11. The non-transitory machine readable medium of claim 1, wherein the graphical assets are rendered by positioning text on one or more of the graphical assets based on properties of at least one graphical drawing in the set of graphical drawings that conveys alignment information for aligning the text above the one or more of the graphical assets.

12. The non-transitory machine readable medium of claim 1, wherein each graphical asset comprises a set of elementary assets, each elementary asset comprising a plurality of images, each image specifying a state, a tint, and a value for the elementary asset.

13. The non-transitory machine readable medium of claim 1, wherein each graphical asset comprises a set of elementary assets, the GUI framework further comprising a set of instructions for receiving non-graphical metadata for annotating the elementary assets to specify one more of a state, a tint, and a value for each elementary asset.

14. The non-transitory machine readable medium of claim 1, wherein each graphical assets comprises a set of elementary assets, the GUI framework further comprising sets of instructions for:
receiving a request from an application to draw a particular rendition of a first graphical asset;
retrieving the first graphical asset and one or more associated graphical drawings;
determining a boundary for rendering the first graphical asset based on the one or more associated graphical drawings; and
displaying the particular rendition of the first graphical asset using the boundary specified by the one or more associated graphical drawings.

15. The non-transitory machine readable medium of claim 1, wherein each graphical asset comprises a set of elementary assets, the GUI framework further comprising sets of instructions for:
receiving a request from an application to draw a particular rendition of a first graphical asset;
retrieving the first graphical asset and one or more associated graphical drawings;
displaying the particular rendition of the first graphical asset and aligning the first graphical asset with other graphical assets using alignment information specified by the one or more associated graphical drawings.

16. The non-transitory machine readable medium of claim 1, wherein each graphical asset comprises a set of elementary assets, the GUI framework further comprising sets of instructions for:
receiving a request from an application to draw a particular rendition of a first graphical asset;
retrieving the first graphical asset and one or more associated graphical drawings; and
displaying the particular rendition of the first graphical asset and text associated with the first graphical asset using a boundary specified by the one or more associated graphical drawings.

17. The non-transitory machine readable medium of claim 1, wherein at least one of the graphical drawings provide pixel data used to display and align one or more of the graphical assets on a graphical user interface.

18. The non-transitory machine readable medium of claim 1, wherein one or more of the graphical drawings specify a set of boundaries of one or more of the graphical assets.

19. The non-transitory machine readable medium of claim 1, wherein one or more of the graphical drawings specify a set of alignment regions for aligning one or more of the graphical assets with an asset selected from a group consisting of: other rendered assets, and an associated text.

20. The non-transitory machine readable medium of claim 1, wherein the set of graphical drawings do not use strings of characters or numbers to specify the alignment information.

21. The non-transitory machine readable medium of claim 1, wherein the set of graphical drawings do not use alphanumeric values to specify the alignment information.

22. A method, comprising:
receiving a set of graphical assets for rendering as an image;
receiving a set of graphical drawings not to be rendered in preparing or presenting the image, the set of graphical drawings specifying alignment information for rendering the set of graphical assets in the image; and
storing the graphical assets and the graphical drawings to an image file,
wherein the graphical assets stored in the image file are rendered and positioned according to a set of coordinates derived from geometric shapes represented in the set of graphical drawings automatically at runtime based on the alignment information specified by the set of graphical drawings, and
wherein at least one geometric shape represented in the set of graphical drawings specifies a visual boundary of a corresponding graphical asset.

23. A system, comprising:
at least one processing unit; and
a non-transitory machine readable medium storing sets of instructions that, when executed by the at least one processing unit, cause:
receiving a set of graphical assets to be rendered as an image;
receiving a set of graphical drawings not to be rendered in the image, the set of graphical drawings specifying alignment information for rendering the set of graphical assets in the image; and
storing the graphical assets and the graphical drawings in an image file for reproducing the image at runtime, wherein the graphical assets stored in the image file are rendered and positioned according to a set of coordinates derived from geometric shapes represented in the set of graphical drawings automatically at runtime based on the alignment information specified by the set of graphical drawings stored in the image file, and wherein the set of coordinates are not obtained from textual metadata.

* * * * *